(12) United States Patent
Dawson et al.

(10) Patent No.: US 9,172,208 B1
(45) Date of Patent: Oct. 27, 2015

(54) RAMAN BEAM COMBINING FOR LASER BRIGHTNESS ENHANCEMENT

(71) Applicant: Lawrence Livermore National Security, LLC, Livermore, CA (US)

(72) Inventors: Jay W. Dawson, Livermore, CA (US); Graham S. Allen, Pleasanton, CA (US); Paul H. Pax, Livermore, CA (US); John E. Heebner, Livermore, CA (US); Arun K. Sridharan, Fremont, CA (US); Alexander M. Rubenchik, Livermore, CA (US); Chrisopher B. J. Barty, Hayward, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 13/771,770

(22) Filed: Feb. 20, 2013

Related U.S. Application Data

(60) Provisional application No. 61/601,536, filed on Feb. 21, 2012.

(51) Int. Cl.
  *G01C 3/08* (2006.01)
  *H01S 3/30* (2006.01)

(52) U.S. Cl.
  CPC ..................... *H01S 3/302* (2013.01)

(58) Field of Classification Search
  CPC ......... G01S 17/10; G01S 7/497; G01S 17/89; G01S 7/487; G01C 3/08
  USPC ......... 356/5.01, 4.01, 3.01, 5.09, 4.07, 9, 625
  See application file for complete search history.

(56) References Cited

U.S. PATENT DOCUMENTS

| | | | |
|---|---|---|---|
| 4,531,058 A * | 7/1985 | Burnham et al. | 250/363.03 |
| 4,922,495 A | 5/1990 | Bobbs et al. | |
| 4,993,031 A | 2/1991 | White, III | |
| 6,456,756 B1 | 9/2002 | Mead et al. | |
| 6,865,318 B1 * | 3/2005 | Hayden et al. | 385/31 |
| 8,199,399 B1 * | 6/2012 | Savage-Leuchs | 359/341.1 |
| 2003/0039293 A1 * | 2/2003 | Scheps | 372/69 |
| 2003/0043453 A1 * | 3/2003 | Smith et al. | 359/334 |
| 2003/0141105 A1 * | 7/2003 | Sugaya et al. | 174/256 |
| 2004/0012778 A1 * | 1/2004 | Li et al. | 356/301 |
| 2005/0078353 A1 | 4/2005 | Komine | |
| 2008/0059135 A1 * | 3/2008 | Murugkar et al. | 703/11 |
| 2008/0131054 A1 * | 6/2008 | Kim et al. | 385/46 |

(Continued)

OTHER PUBLICATIONS

Red Optronics. "KTP Crystal". 2006. http://www.redoptronics.com/printable/crystals/ktp_crystal.htm.*

(Continued)

*Primary Examiner* — Isam Alsomiri
*Assistant Examiner* — Samantha K Abraham
(74) *Attorney, Agent, or Firm* — John P. Wooldridge

(57) ABSTRACT

An optical source capable of enhanced scaling of pulse energy and brightness utilizes an ensemble of single-aperture fiber lasers as pump sources, with each such fiber laser operating at acceptable pulse energy levels. Beam combining involves stimulated Raman scattering using a Stokes' shifted seed beam, the latter of which is optimized in terms of its temporal and spectral properties. Beams from fiber lasers can thus be combined to attain pulses with peak energies in excess of the fiber laser self-focusing limit of 4 MW while retaining the advantages of a fiber laser system of high average power with good beam quality.

32 Claims, 11 Drawing Sheets

(56) References Cited

U.S. PATENT DOCUMENTS

| | | | |
|---|---|---|---|
| 2008/0170289 A1* | 7/2008 | Rice et al. | 359/334 |
| 2008/0174777 A1* | 7/2008 | Carron | 356/328 |
| 2008/0265165 A1* | 10/2008 | Yeh et al. | 250/341.1 |
| 2010/0290487 A1* | 11/2010 | Wu | 372/21 |
| 2011/0176563 A1* | 7/2011 | Friel et al. | 372/3 |

OTHER PUBLICATIONS

Omega Optical, Inc. "Raman Spectroscopy General Overview". 2010. http://www.omegafilters.com/Capabilities/Applications/Raman_Spectroscopy/Raman_General.*

Okawachi, Yoshitomo; Mark A. Foster; Jay E. Sharping; and Alexander L. Gaeta. "All-Optical Slow-Light on a Photonic Chip". Optical Society of America, 2006. http://www.ece.rice.edu/ece/xugroup/Papers/All-optical%20slow-light%20on%20a%20photonic%20chip.pdf.*

JDSU. "High-Power 10 W 976 nm Fiber-Coupled Diode Laser". Sep. 2008. http://www.jdsu.com/ProductLiterature/6398l4t_ds_cl_ae.pdf.*

Volman, David H. "Advances in Photochemistry, vol. 15". p. 181. Copyright 1990, John Wiley & Sons, Inc.*

* cited by examiner

RAMAN BEAM COMBINING FOR LASER BRIGHTNESS ENHANCEMENT

CROSS-REFERENCE TO RELATED APPLICATIONS

This application claims the benefit of U.S. Provisional Patent Application No. 61/601,536 titled "Raman Beam Combining for Laser Brightness Enhancement," filed Feb. 21, 2012, incorporated herein by reference.

STATEMENT REGARDING FEDERALLY SPONSORED RESEARCH OR DEVELOPMENT

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND OF THE INVENTION

1. Field of the Invention

The present invention relates to optical sources, and more specifically, it relates to enhanced scaling of the pulse energy and brightness of optical sources.

2. Description of Related Art

The need for, and, scalability of, high-energy, high-average power optical sources continues to grow with increasing demands in such diverse fields, including materials processing, precision drilling and machining, homeland security, energy needs, defense, oil-well exploration, remote sensors, medical technology, 3-D lithography and nanotechnology.

Practical and fundamental issues necessitate the need for novel approaches to the design and realization of next-generation optical sources. Practical issues include efficiency, size, weight and volume constraints, whereas fundamental issues include optical damage limitations and thermal and nonlinear optical effects, to name a few. Some of these constraints limit the design of the laser itself, whereas other constraints present engineering challenges to the realization of methods to, in effect, combine the outputs of lasers and optical amplifiers, which are otherwise limited as stand-alone devices.

Typically, in addition to high-power and high-energy, lasers with high-quality output beams are in demand to meet the expectations for precision processing, high-brightness applications and overall system efficiency. As an example, in many applications, a laser system that includes a coherent summation of high-quality lasers and/or laser amplifiers can provide a viable solution, yet, in general, is fraught with its own unique limitations.

The last decade has seen a tremendous advance in the pulse energy output of double-clad 1 μm fiber amplifiers. As these devices reach their single aperture damage-limited pulse energy, there is renewed interest in beam combination as a means of scaling the energy further. Note that prior art that employs an optical fiber for Raman amplification is not applicable to solving the issue of attaining >4 MW through beam combination, as the 4 MW limit is imposed by the fiber itself.

Maintaining good beam quality remains a challenge in fiber laser systems that are designed to generate millijoule class, 1 ns pulses at high repetition rates. In the prior art, the optimal approach involves design rules that conflict with one another. As an example, to achieve high-pulse-energy output from fibers, the core diameter needs to be increased to stay below the damage fluence, while the numerical aperture (NA) is reduced to ensure that only a few transverse modes are guided. On the other hand, to achieve a compact geometry, the fibers need to be bent, leading to increased radiative losses for the higher-order modes and reduction in the mode field diameter and, therefore, the extractable pulse energy. Pulse energy scaling of a single-aperture fiber laser or amplifier with good beam quality is also difficult, because long fiber lengths combined with tightly confined modes and high peak powers can trigger the onset of undesirable nonlinear effects including stimulated Brillouin scattering and stimulated Raman scattering, thereby limiting the energy scaling.

Experimental results showing significant brightness enhancement and 60-70% conversion efficiency were demonstrated by the LNL group led by Goldhar and by other groups as well. With the rapid development of bulk diode-pumped 1 μm solid state lasers and UV conversion nonlinear crystals since the late 1980's, some of the interest in Raman beam combining waned, with relatively fewer papers being published since the 1990's [Heuvel1992, Heuvel1993, Heuvel1995, Murray1999, Chulkov2006].

Beam combining approaches discussed in the literature fall into two broad categories: incoherent and coherent. In the case of incoherent beam combining, multiple free-running, uncoupled and independent input lasers are utilized. Each laser operates at nominally the same or slightly different wavelengths, with the ensemble positioned side-by-side and allowed to combine in the far field. Given that the relative phases or spectra of the laser elements are not controlled, the resultant radiance or brightness ($B=P/(\lambda^2(M^2)^2)$) of the combined beam is therefore not any greater than that of a single laser. If the wavelengths of the individual laser elements are different and carefully chosen, it is then possible to use a dispersive element, such as a grating, to combine the individual laser elements in the far field. This incoherent approach is called "wavelength beam combining" (WBC) and has been pursued by the Lincoln Lab group which has achieved 35 W with $M^2=1.35$ in both dimensions from 100 laser diode elements [Chann2005]. With WBC, the individual elements overlap both in the near and far field, and, consequently, the spatial brightness therefore scales as a function of the number of individual elements, N. Since the power spectra of individual elements in the WBC approach are not allowed to overlap, spatial brightness is enhanced at the expense of spectral brightness. In a key end-user application of interest, this approach is difficult to practically implement, because the required output line-width, in this case, must be less than 50 GHz.

The other major approach to beam combining is referred to as coherent beam combining (CBC). In the simplest configuration, the multiple lasers are, as before, positioned side-by-side, but, in this case, fabricated to operate at the same center wavelength and spectrum. In addition, the ensemble of laser sources are phase locked so that their fields add coherently in the far field. If the phases are controlled to within a small fraction of the wavelength, the total power and brightness scale proportionally to the number of individual laser elements. Over the past three decades, several different implementations of CBC have evolved. In one case, referred to as the "common-resonator" approach, typically, individual laser diode elements are placed inside a common optical resonator. Coherent beam combination takes place due to feedback from the resonator [Leger1987, Leger1988, Corcoran1991, Kono2000, Fan2005]. In another case, referred to as the "evanescent-wave" or "leaky-wave" coupling approach [Welch1994, Fan2005], semiconductor laser elements are placed, in close proximity to each other, so that their field distributions overlap. If the neighboring elements are in phase, then it is possible to achieve high on-axis far field intensity. This approach, however, is difficult to achieve in practice with large arrays because the some of the elements tend to combine π out of phase.

Yet another CBC approach, [Ishaaya2004, Minden2004, Fan2005, Corcoran2008, Bochove2009] which has been specifically applied to combining fiber elements is referred to as the "self-organizing" or "supermode" approach. In this approach, multiple fiber lasers are placed in a common resonator. The spectrum of each individual fiber laser self-adjusts, as the elements of the ensemble injection lock to each other and minimize the loss of the array. Approximately 10 fiber lasers have been combined with this approach, though further scaling has been difficult to achieve.

Still another major CBC implementation approach uses active feedback to control the phase of each individual element. This approach has been mainly used recently in the context of an array of fiber amplifiers (as opposed to laser oscillators) configured in a master-oscillator, power-amplifier (MOPA) arrangement, which is seeded by a common (i.e., master) oscillator. The wavelength-scale (modulo 2π) path-length differences amongst the fiber array amplifier elements are detected by heterodyne mixing of the output with a reference laser. The generated feedback is used to drive modulators that add the appropriate amount of phase to each individual laser amplifier to phase-lock the ensemble. As a result of these parallel, servo-controlled amplifier legs, the resultant path-length differences are nulled out, with the result that the waves from each element constructively interfere to produce an enhanced brightness output in the far field. [Anderegg2003, Augst2004, Fan2005, Shay2006].

In addition to the linear approaches described above, the prior art also includes nonlinear optical approaches to coherently combine laser elements. This technique is referred to as "optical phase conjugation." and uses a nonlinear optical interaction in a given medium to realize phase coherency amongst an ensemble of laser amplifiers. Examples of such optical interactions for coherent beam combining include stimulated Brillouin scattering (SBS) [Moyer1988, Rockwell1993, Sumida1994, Fan2005] and stimulated Raman scattering (SRS). In a key end-user application, the optical pumping laser elements are necessarily broadband spectrally. Given the constraints of SBS, the use of broadband pump sources precludes the use of this nonlinear optical interaction for efficient beam combining. Hence, phase conjugation via SBS is therefore not an option.

Stimulated Raman Scattering has been studied over the last three decades. Much of the early work in the late 1970s and 1980s has been in the context of improving the brightness of UV generating excimer lasers [Goldhar1982, Chang1983, Goldhar1984, Chang1985, George1985, Eggleston1986JOSAB, Eggleston1986JQE, Korff1986, Komine1986, Reintjes1986, Fulghum1986, Partanen1986, Shaw1986, Flusberg1987, White1990]. These papers elucidate the theory of Raman amplification systems with either single or multiple coherent and incoherent pump sources, narrow or broad bandwidth pumps sources, and collinear or non-collinear interaction between the pump and signal waves. These papers also model the beam-quality of the amplified Stokes wave with moderate to severe input pump wave aberration. Experimental results showing significant brightness enhancement and 60-70% conversion efficiency were demonstrated by the LLNL group led by Goldhar and by other groups as well.

As noted above, with the rapid development of bulk diode-pumped 1 μm solid state lasers and UV conversion nonlinear crystals since the late 1980's, some of the interest in Raman beam combining waned, with relatively fewer papers being published since the 1990's [Heuvel1992, Heuvel1993, Heuvel1995, Murray1999, Chulkov2006]. The last decade has seen a tremendous advance in the pulse energy output of double-clad 1 μm fiber amplifiers. As these devices reach their single-aperture damage-limited pulse energy, there is renewed interest in beam combination as a means of scaling the energy further. Since these pulsed fiber amplifiers possess relatively high peak powers, it makes sense to re-employ the Raman effect, which is peak-power dependent, to enhance the brightness and peak power available from a single aperture.

SUMMARY OF THE INVENTION

It is an object of the invention to provide an optical source capable of enhanced scaling of pulse energy and brightness. An embodiment of the invention utilizes an ensemble of single-aperture fiber lasers as pump sources, with each such fiber laser operating at acceptable pulse energy levels. Beam combining involves stimulated Raman scattering in a novel configuration, using a Stokes' shifted seed beam, the latter of which is optimized in terms of its temporal and spectral properties.

The present invention employs a solid Raman crystal where the pump can be fully confined in the crystal in both transverse dimensions by a total internal reflection (TIR) coating. A birefringent crystal acts to maintain polarization and total internal reflection of the pump, allowing for a significant reduction in pump brightness. The TIR coating allows for greatly reduced pump beam quality, hence higher pump intensity and a lower energy threshold for the Raman process. By fully confining the pump light, we are able to work with pump light that has significantly lower brightness than the system of Goldhar. The pump lasers in the system of Goldhar have a crossing angle of less than 0.3°, while our system operates with crossing angles of up to 20°.

Our team investigated several technical approaches to achieving a laser system with a short pulse width, high pulse energy, high average power, efficiency, beam quality and broad wavelength tunability, and developed a new approach to Raman beam combining, based upon our analysis. In Raman beam combining, pulses having relatively poor spatial characteristics are spatially combined at a single crystal. An appropriately-chosen crystal transfers the lasers' aggregate energy to a single high-quality Stokes seed via the Raman effect.

Basic aspects of the invention include: (1) A Raman gain media configured in a light-pipe geometry; (2) An ensemble of multi-spatial-mode fiber lasers that collectively provides a Raman pump source; and (3) Temporally shaped pump and signal pulses optimized in the presence of saturation effects for efficient pump/signal beam coupling. Below we discuss these aspects with attention to their interplay in the overall system.

The use of multi-mode fiber lasers for Raman pumping is a new aspect of this invention. Multi-mode fiber lasers have seen only limited use, mainly for gross machining applications, because of their inherently poor spatial beam quality. Multimode fiber lasers have not been used previously for Raman pumping due to poor beam quality making it difficult to maintain a tightly focused spot over the extended length of the crystal.

We solve this problem by using a long, highly multimode light-pipe as the Raman conversion element. The large range of input acceptance angles enables spatial multiplexing of the signal and a large number of multimode pump beam arrays, which, in the prior art, were restricted to spectral multiplexing using dichroic elements, using beams of low divergence.

Moreover, our light-pipe is prepared with a. FIR coating along its sidewalls, which has a very high acceptance angle, while maintaining pump confinement for many times the natural diffraction length of the beam. Thus, relatively long Raman crystals can now be considered in the embodiments discussed herein, as well as the use of multi-mode (highly diverging) fiber lasers as pump sources, which, collectively, result in more accommodating design rules that can greatly improve the overall system efficiency, cost and weight.

In addition, we use a fiber-optic master-oscillator-power amplifier (MOPA) fiber architecture, compared with the KrF Q-switched lasers used by Goldhar. The fiber optics offer higher efficiency, improved pulse stability, shorter pulses and operation at higher pulse repetition frequencies. One of the significant limitations of the Goldhar system is that pump laser showed significant intensity fluctuations, which translate into gain fluctuations. The MOPA architecture herein allows for precise control of the pulse temporal profile and the relative timing of the pump and signal pulses. The precise timing and stable pulse shape allow for better overlap of the pump and signal pulses, minimize deleterious temporal fluctuations, thereby significantly improving the overall system efficiency.

Another aspect herein is the use of a high gain Raman gain crystal with bounds on thermal and non-linear parameters that result in attaining efficient (>80%) transfer of the pump light to the signal beam without degrading the signal beam quality due to thermal and non-linear effects.

Yet another aspect herein is the use of a. Raman gain crystal fabricated with a relatively low-refractive index optical coating on the side-walls so as to provide a light guide for the pump light.

The dimensions of the Raman gain crystal are designed to maintain the intensity of the pump and signal light below the damage threshold of the material. Furthermore, the gain medium is designed to permit the signal beam to pass through the crystal without beam quality degradation due to interaction with the walls of the crystal. The signal beam is specified so that its focusing parameters are designed to assist with minimizing deleterious effects due to thermal and nonlinear distortion.

A further aspect of the above constraints is that the beam quality of the pump can be quite poor—as it is confined by the crystal light pipe—while the signal beam quality is maintained at a high quality level as it averages intensity fluctuations of the pump beam as it traverses the crystal.

Yet another aspect herein is that the temporal profile of the pulses for both the pump and signal fiber lasers are designed to be effectively super-Gaussian or "square" in the time domain in order to avoid Raman gain fluctuations (and efficiency degradations) due to temporal variations of the intensity of the pump light.

Moreover, the pump and signal wavelengths are controlled by respective wavelength-stable single-frequency master oscillators designed to have a specific wavelength separation, matched to the Raman shift of the crystal gain medium so as to avoid efficiency degradations due to imperfect wavelength separation between the pump and signal.

The pump and signal fiber lasers are designed to minimize the accumulated self phase modulation of the pump and signal pulses so as to minimize any bandwidth broadening. A specific goal of the fiber laser design is to ensure that any bandwidth broadening is small enough to prevent the pump and signal bandwidth from exceeding the Raman gain bandwidth of the crystal and thus either degrading efficient operation and/or creating undesirable intensity fluctuations in the output signal.

A key feature of the invention is that the pump fiber laser may employ multimode fibers in the amplification chain, as the beam quality of the pump laser is not, in general, a requirement in the system. This is advantageous as removing the constraint of maintaining good beam quality in the pump laser increases the amount of pulse energy that can be extracted from the pump laser system within the other design constraints. By contrast, in the prior art, a major constraint is that the pump lasers possess high-quality beam profiles, limiting potential brightness enhancement. The resulting system herein therefore provides a high-energy, high-average power source of laser radiation, with good beam quality, high pulse contrast (a unique aspect of the Raman amplification process), narrow bandwidth, efficient source of laser radiation.

Another aspect of this invention is that the use of a light-pipe geometry for the Raman gain crystal permits spatial multiplexing of the pump and signal beams. This eliminates the need for a dichroic mirror to combine the pump and signal beams, as is the case in prior-art systems. This approach to combining the pump and signal beams enables one to employ Raman crystals with Raman shifts that are arbitrarily small. We have identified high-gain Raman lines with Stokes shifts less than 100 $cm^{-1}$, which would be difficult to access with highly divergent beams and dichroic beamsplitters. Small Raman shifts are advantageous in that they minimize the thermal degradations by minimizing heat deposition, as well as improve overall system efficiency by minimizing the quantum defect induced loss of the system.

An array of monolithic, highly multimode fibers, each emitting pulses having relatively poor spatial characteristics, are spatially combined at a single crystal. The crystal transfers the lasers' aggregate energy to a single high-quality seed via the Raman effect. The approach does not require sub-wavelength phase control or diffraction-class alignment tolerances, making it inherently immune to shock, vibration, and dynamic thermal gradients. In this approach, beams must simply arrive within a fraction of the pulse duration, rather than within a fraction of the operating wavelength. The fiber-based MOPA assures synchronous arrival of the pump pulses, while a master trigger assures synchronization of the MOPA master oscillator with the seed (signal) beam, Raman-shifted source.

The lasers being combined (unit cells) can have poor spatial beam quality and large cross-sections, which significantly increase the energy available from each. The unit cells can operate near their extraction limits since the combination process is not affected by phase distortions. These attributes maximize the energy provided by each cell and thus reduce the cell count and the system's size, cost, and complexity.

The quality of the combined beam is almost entirely determined by the quality of the seed. Since the seed's energy is modest, its pulses can be carried by a diffraction-limited (single-mode) fiber operating well below the thresholds for nonlinear distortions. In the event of such nonlinear distortions, in one embodiment, the Raman gain crystal medium can be chosen to be a material with a negative change in refractive index with temperature. This design rule enables the potential of partially or completely offsetting, or compensating for, two different output beam-quality degradation mechanisms: wavefront distortions due to the non-linear Kerr Effect and wavefront distortions due to thermal gradients.

Raman conversion is carried out in a variety of crystals, with forgiving alignment tolerances. Preferred crystals will have a large Raman gain coefficient, a high thermal conductivity, low or even negative thermo-optic coefficients and a modest Raman shift. These Raman crystals are amenable to polishing and thin-film coat techniques, as is known in the art.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

The present invention employs stimulated Raman scattering (SRS) as a mechanism for efficiently combining the outputs of multiple fiber lasers (unit cells) into a single high-energy, high average power laser beam. The primary advantages of this concept are that the SRS process can combine beams having relatively poor spatial and phase qualities, and that the lasers do not need to be aligned to the combining-crystal with high accuracy. These advantages translate into a system that has a minimal number of lasers, with concomitantly low costs and complexity and a high tolerance for thermal and mechanical perturbations.

Further, we show that the unit cells and the Stokes seed laser fall within the current state of the art of fiber and component manufacturers, and are thus relatively low-risk to produce.

Basic System Embodiment

Figure 1A:
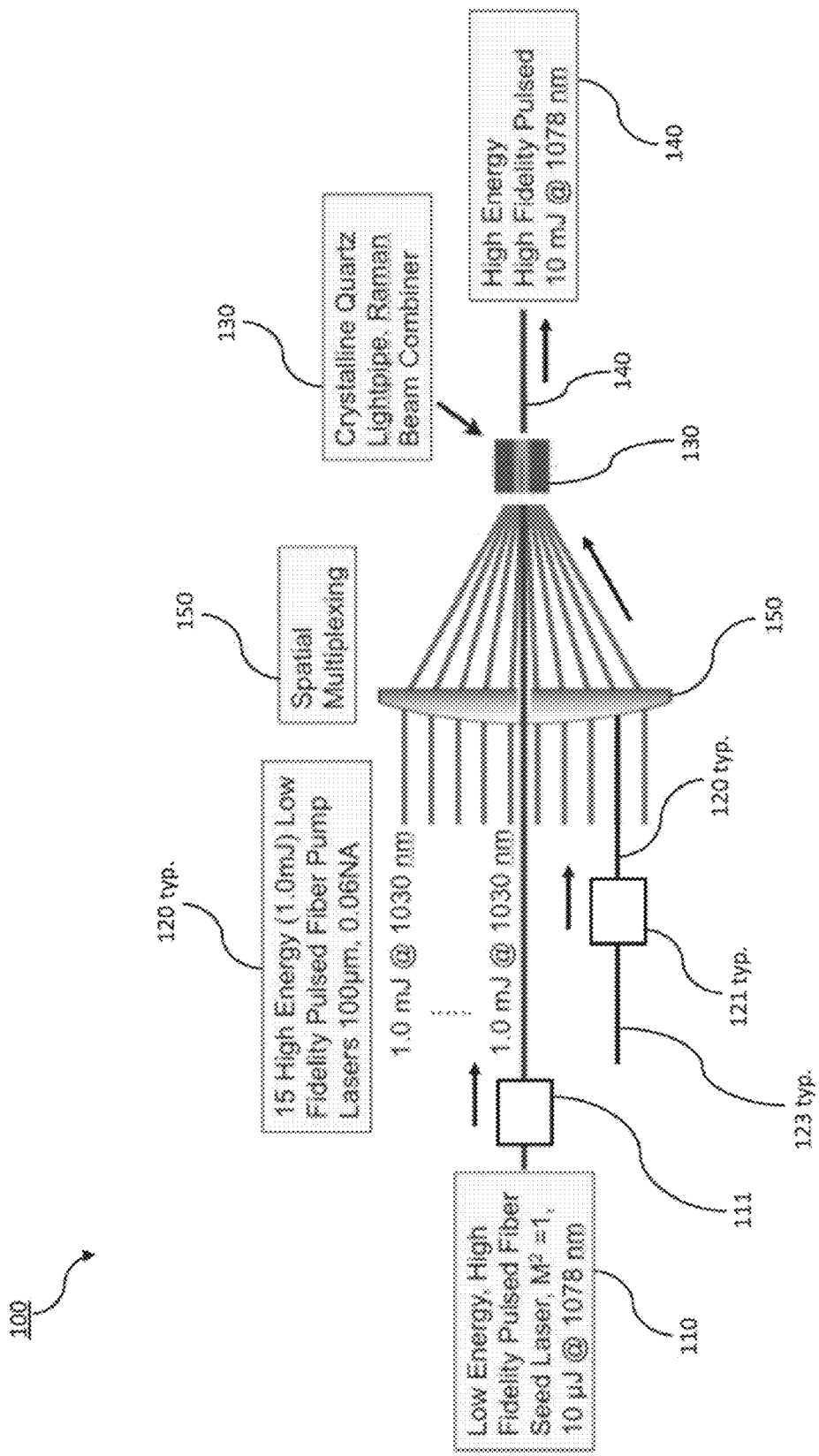
FIG. 1A shows a drawing of the overall Raman beam combination concept.

FIG. 1A illustrates a basic embodiment of the beam combining concept system 100. Two classes of synchronously timed, pulsed optical beams—a signal (or seed) beam 110, and a plurality of pump beams 120—are all incident, simultaneously, upon a Raman crystal 130. The signal beam is typically of much lower energy, typically, in the range of $E_s \approx 10$ μJcoules, relative to the energy of the pump beams, typically, each in the range of $E_p \approx 1.0$ mJoule. Moreover, the signal beam 110 is of a high-beam quality in a spatial wavefront sense (typically, in the range of $M^2=1$), relative to the pump beams (typically, in the range of NA≈0.06, for a beam waist 100 fpm). The function of the system is to provide a high-fidelity, highly amplified signal beam 140 at the output, typically, in the range of $E_s \approx 10$ mJoules, while maintaining its high-beam quality ($M^2 \approx 1$), with the increased energy derived from the ensemble of pump beams 120. In essence, therefore, the energy of all the spatially multimode incident beams are combined by the nonlinear Raman crystal 130 into a single-spatial mode, coherent, amplified output signal beam 140, while maintaining essentially the same high-quality beam parameters of the initial input signal beam 110.

In this embodiment, the Raman medium, nominally crystalline quartz, is cut and polished into the shape of a long rectangular parallelepiped, with end faces in the form of a square cross section, and, with all the incident beams (signal and pumps) entering it at one end face. The crystal acts as a highly multimode "light pipe," mixing the pump beams spatially and providing the medium for the Raman conversion process.

As noted above, optimized energy beam combining requires precision control of the pulse widths and rise/fall times of the pump and signal beams, as well as the synchronicity of their temporal overlap in the Raman crystal. Moreover, the efficiency of the beam combining process is a function of the optical bandwidth, relative timing, and the time-dependent pulse intensity (i.e., the optical pulse amplitude) of the beams. These critical beam-forming/conditioning parameters are controlled by electro-optic, gated modulators 111 and 121, for the signal and pump-beam ensemble, respectively with a common synchronization trigger.

The wavelengths of the signal and pump-beam ensemble are chosen such that the wavelength difference of the two sets of beams is set to be equal to the Raman shift of the nonlinear crystalline medium 130. As an example, in the case of a quartz Raman medium, the wavelengths of the pump and probe beams are specified to be, respectively, 1030 nm and 1078 nm.

The Raman shift is a function of specific quantum energy-level differences within a given medium, and is a fundamental characteristic of its atomic and/or molecular quantum structure. Under well-known conditions, therefore, a pair optical beams (e.g., a signal beam and a pump beam), whose photon energy difference is approximately equal to the Raman shift in a given medium can resonantly interact within the crystal and, as an example, can exchange energy amongst the pair. The nonlinear optical process, in this case, is referred to as Stimulated Raman Scattering (SRS).

Returning, now, to FIG. 1A, the pump beams, 120 are comprised of a set of pulsed fiber lasers of modest optical beam quality, whose respective output beams are timed to within a fraction of a pulse width (rather than to a fraction of an optical cycle) by the set of E-O modulators, 111 and 121. The pump beams are then focused by optical element 150 and directed into the SRS crystal 130. The optical element 150 can be considered as a "spatial multiplexer" in that it enables a collection of incident beams to be coupled into a single, long Raman medium 130.

Figure 1B:
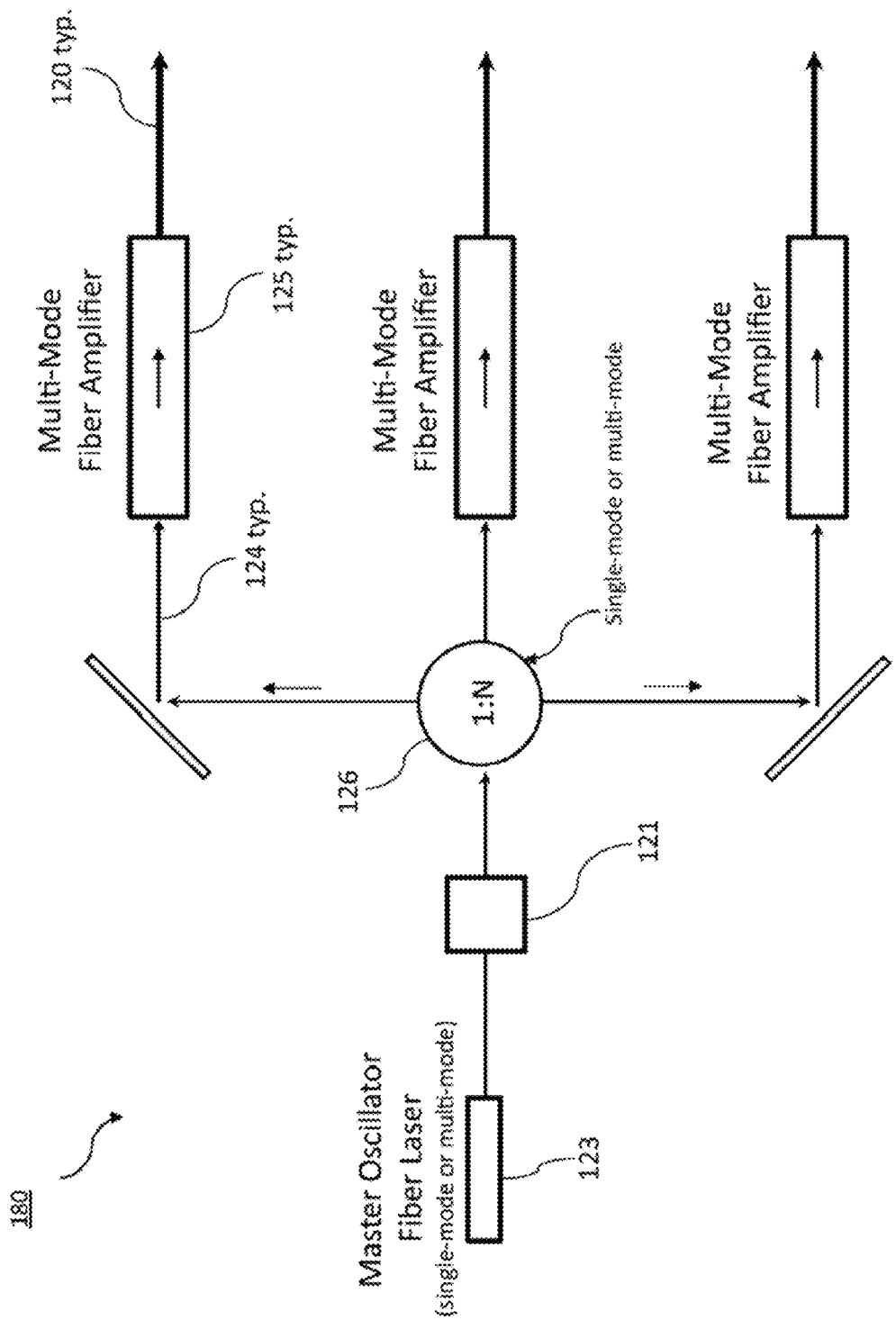
FIG. 1B shows a fiber-based master oscillator power amplifier system to generate an array of frequency-locked, multi-mode laser pump beams.

In an embodiment, the pump laser sources 120 (of FIG. 1A) are derived from a fiber-optic master-oscillator-power amplifier (MOPA) fiber architecture, 180 as shown in FIG. 1B. In this approach, the entire array 120 of pump beams will nominally be at the same optical wavelength, and, furthermore, can be controlled by a common pulse conditioner. The result is that the effective Raman gain profile induced by each pump beam within the medium 130 will be identical, resulting in a more efficient Raman conversion process.

The fiber-based MOPA "pump beam" array 180 shown here is comprised of a fiber laser "master oscillator" 123, which provides a common input beam to a 1:N beam splitter (or, 1:N beam fan-out module) 126. The beam splitter provides a set of N nominally identical output beams 124, each of which is subsequently directed into a respective (nominally identical) multi-mode fiber amplifier 125, arranged in a parallel configuration. The set of amplified, parallel output beams 120 form an array of multi-mode pump beams, identified in FIG. 1A as 120. A single optical beam conditioning device (such as a high-bandwidth E-O modulator) 121 provides the necessary control of the entire pump beam array in terms of timing pulse width, amplitude temporal shape, etc., all in parallel, thereby ensuring that each multimode pump beam 120 that comprises the output array is essentially identical in terms of its optical properties. The fiber optic MOPA offers higher efficiency, improved pulse stability, shorter pulses and operation at higher pulse repetition frequencies.

One of the significant limitations of prior art systems is that the pump lasers, can, in general, possess significant intensity fluctuations, which are deleterious in that they translate into Raman gain fluctuations. The MOPA architecture herein minimizes such fluctuations by functioning in the saturated regime of the set of multimode optical amplifiers 125. Moreover, a common master oscillator allows for precise control of the pulse temporal profile and the relative timing of the pump pulse array. The precise timing and stable pulse shape further allow for better overlap of the pump and signal pulses, thereby significantly improving the overall system efficiency. Moreover, the ensemble of multiple beams 120 that comprise the pump beam array are multi-spatial mode in general resulting in a more homogenized Raman amplifier gain profile throughout the volume of the Raman crystal light-pipe 130.

Returning to FIG. 1A, the Raman medium 130, nominally crystalline quartz, is cut and polished into the shape of a long rectangular parallelepiped, with all the incident beams entering it at one end. The pump beams 120 are incident into the long crystal at a multiplicity of angles relative to the optical axis by the spatial multiplexing optical element 150. In general, as the array of pump beams traverses the crystal, they will strike the side-walls at various points and experience total internal reflection, essentially tracing out a "zigzag" trajectory along the length of the crystal.

The signal beam 110 is also incident upon the same crystal. However, in this case, the signal beam is aligned, and, its beam waist specified, so that it propagates directly along the optical axis of the crystal, without striking its side-walls. Thus, the effective crystal (distributed) aperture does not impede the trajectory of the signal beam. The crystal, therefore, acts as a "light pipe," confining the pump beams and the signal beam along its length, and, in the processes, mixes the pump beams spatially with the signal beam, thereby providing an extended medium for the Raman conversion process.

Figure 2:
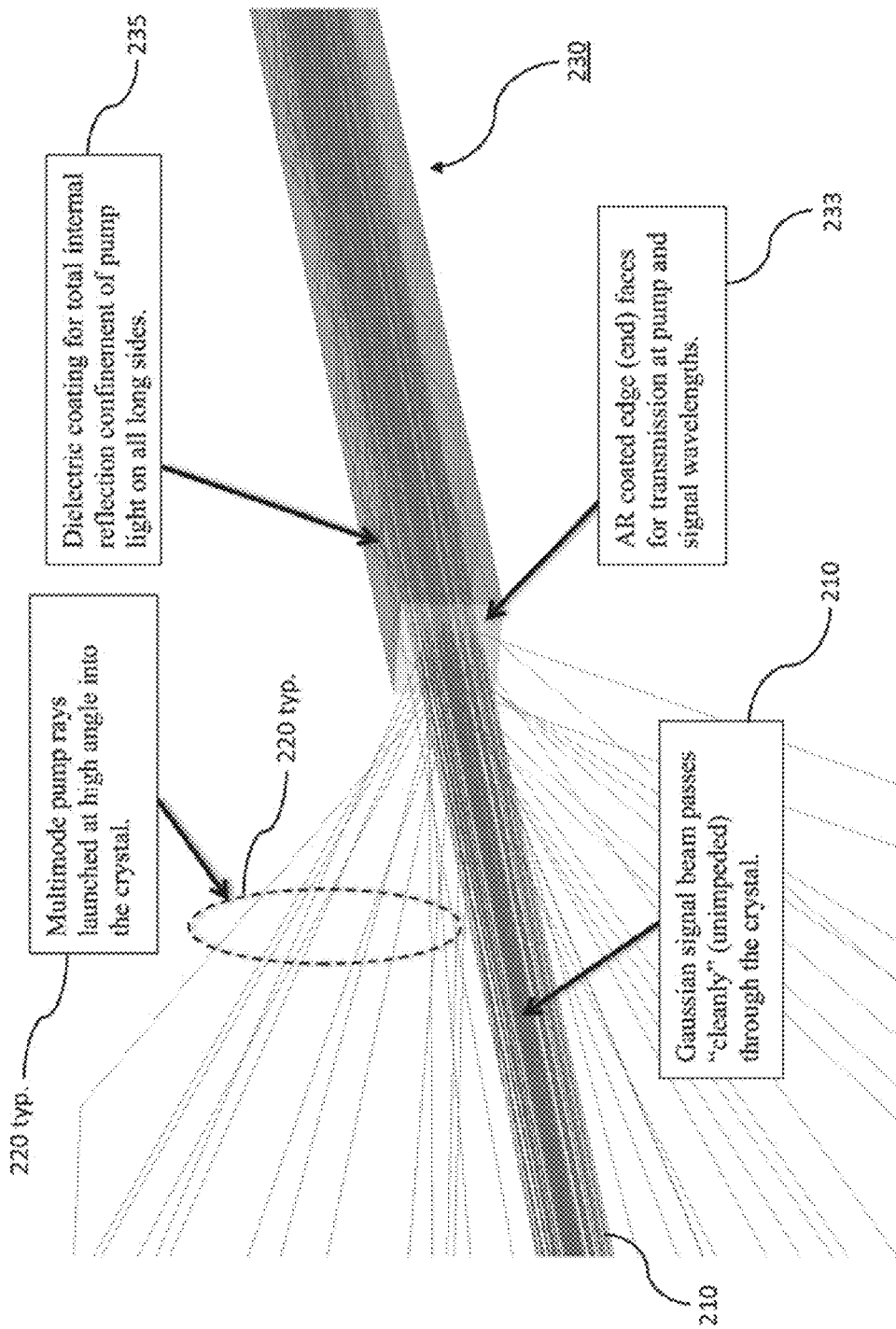
FIG. 2 depicts a close-up of a Raman crystal showing pump and signal beams.

FIG. 2 shows a detailed view of the incident signal beam 210 and the ensemble of pump beams 220, as they couple into the Raman light-pipe 230, as well as details of the light-pipe itself. The Raman light-pipe 230 is comprised of a long rectangular crystal with square edge (or, end) faces, the latter providing an aperture through which the various beams enter and exit the crystal. The pair of end faces 233 is coated with a thin film of dielectric material to provide an anti-reflective (AR) surface for efficient coupling of the beams into and out from the crystal.

Typically, the pulsed pump rays 220 enter the end face of crystal over a set of relatively large incident angles (not shown here, for simplicity, is the beam coupling lens 150 of FIG. 1A). The pump rays are confined within the crystal by a total internal reflection (TIR) dielectric coating 235, deposited on all four side-wall surfaces, along the entire length of the crystal. The set of pump waves typically impinge upon the side-walls 235 of the crystal in both transverse directions, thereby forming a three-dimensional zigzag pattern as they traverse through the crystal. The use of a TIR coating on a Raman crystal is new and unique to this invention relative to the prior art.

Concomitant with the pump beam array, pulses from a single, high-fidelity seed laser form the signal beam 210, which arrive at the crystal simultaneous with the pulses from the pump-beam array 220. The signal beam is restricted to a relatively small set of near-normal incident angles, and is aligned to propagate essentially parallel to, and collinear with, the optical axis of the crystal. The set of incident angles that comprise the signal beam are chosen such these rays do not, in general, impinge the side-walls of the crystal and, hence, are unimpeded by the light-pipe during traversal.

Note that the relatively large difference in the angles-of-incidence of the signal beam (nominally normal to the end face of the light-pipe) and the pump beams (nominally, incident at large angles) provide a means by which to spatially distinguish amongst these two classes of beams. This is in contrast to the prior art, in which the pump and signal beams are typically coupled into a Raman medium using a dichroic beam splitter. Thus, the prior art requires a specially designed element, with a critical set of design rules and constraints. As an example, the functionality of a dichroic element is, in general, a function of the angles of incidence of the two wavelength-differing beams, is limited to a finite range of acceptance angles of each wavelength (which, typically, limits both sets of input beams to be of low divergence), and, moreover, is a function of the polarization and wavelength of the various beams. One can define a dichroic element as a "spectral multiplexer."

By contrast, the use of a light-pipe 230 to combine the beams relaxes many of the constraints typical of spectral multiplexing. The light-pipe distinguishes the pump and signal beams by angle, as opposed to by wavelength. One can define this embodiment herein as "spatial multiplexing," as opposed to spectral multiplexing via a dichroic beam splitter. Hence, the light-pipe can efficiently combine beams of high divergence (as opposed to the divergence limitations of the spectral multiplexing approach), thereby enabling the use of large-divergence, highly multi-mode fiber pumps, resulting in improved beam combining system efficiency. Moreover, the use of spatial multiplexing eliminates the need for a specialized, limited dichroic element, as required by the prior art.

The wavelengths of the pump beams and the seed are chosen to differ by the Stokes' shift, whose magnitude is a function of the material that comprises the Raman crystal. During operation, the Raman crystal provides a nonlinear optical interaction that can result in a transfer of the pump array's energy to the seed beam. Therefore, ideally, the only beam that exits the crystal at its far end face is in the form of a highly amplified and intensified signal beam, which preserves the high-quality beam and spectral characteristics of the incident seed beam 210. In the point design described herein, a stream of 10 mJ amplified signal-beam pulses, with high spatial, temporal, and spectral fidelity, will emerge from the crystal 230.

Figure 3:
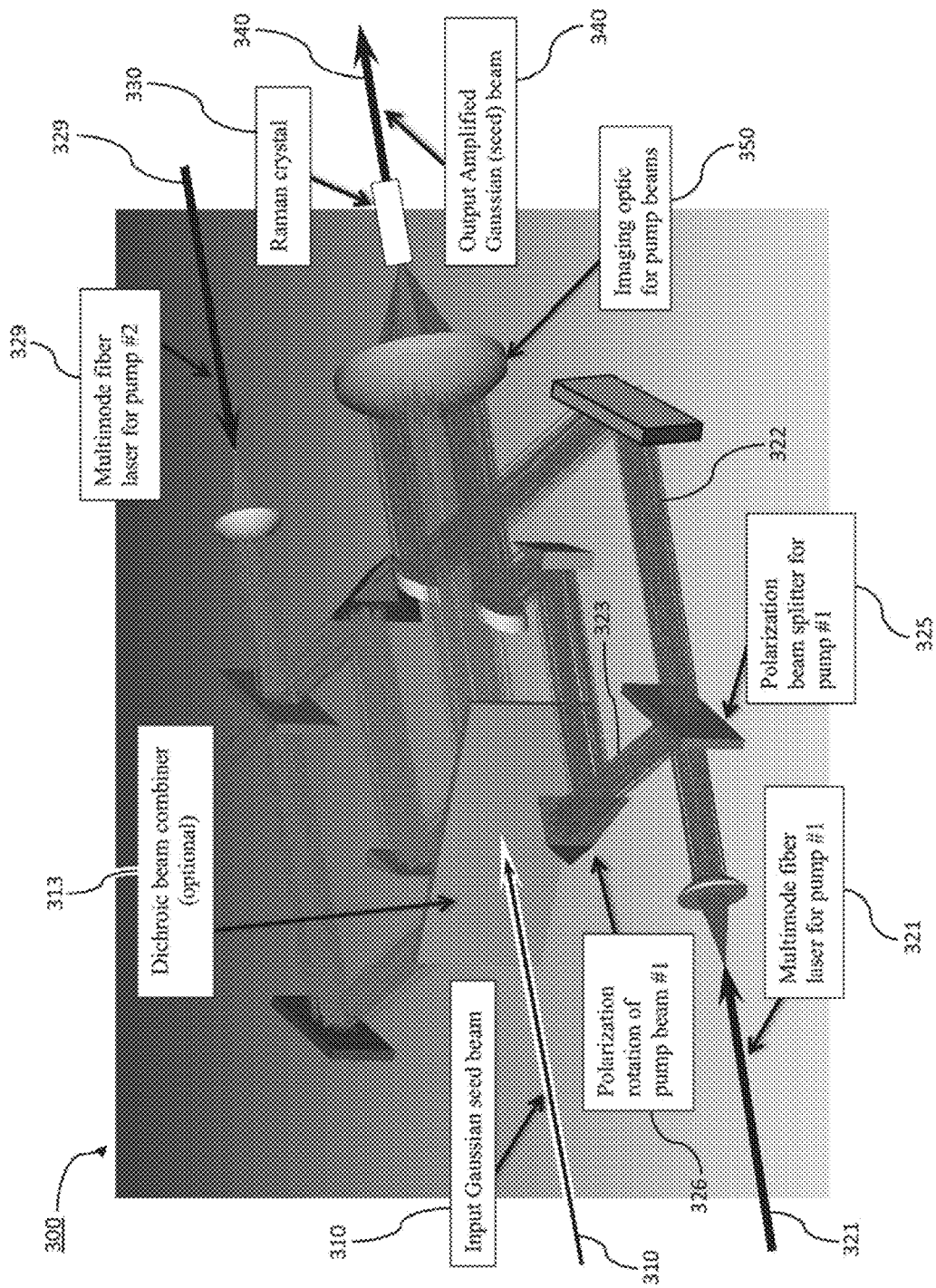
FIG. 3 depicts a layout of an optical launch system for the pump and signal beams.

Turning now to FIG. 3, an exemplary overall optical layout 300 of the system is shown, illustrating the spatial multiplexing of a signal (or, seed) beam 310 with an ensemble of pump-laser beams 321 and 329 into a Raman crystal 330. The Raman crystal 330 produces a high-quality, output beam 340, which is in the form of an intensified and amplified seed beam 310.

Without loss of generality, in this example, two multimode fiber lasers, 321 and 329 respectively, are shown, which are labeled as pump #1 and pump #2, respectfully. In general, the number of pump lasers can be scaled in quantity, depending on the desired end-user requirements. Imaging optic 350 provides a means by which the ensemble of pump beams, along with the seed beam, are all coupled into the common Raman crystal light-pipe, 330, at a single end face of the medium. Recalling the configuration of FIG. 2, the pump beams are coupled into the light-pipe 330 over a large set of off-axis incident angles, whereas the seed beam is coupled into the same light-pipe, the latter, nominally at, or near, normal incidence. As noted above, the pump beam array and the signal (seed) beam are all incident upon a common end face of the crystal 330. Each of these pump beams is derived from a multimode fiber, or, as shown in FIG. 1B, from a fiber-based multimode MOPA, allowing a combination of a very large effective number of unit laser cells per input location (321 and 329).

Returning to FIG. 3, each multi mode fiber pump beam is, in general, comprised of two orthogonal polarizations (i.e., a depolarized optical source). In such a case, a polarization beam splitter 325 is used to partition each polarization component to propagate along a different arm of the system, depicted by beam lets 322 and 323. One of the polarization beamlets, 323, is rotated by 90°, as shown by optical element 326, resulting in a pair of co-polarized beamlets, both derived from pump beam #1 in this example. The optical system maps this pair of (now co-polarized) beamlets into two different paths that impinge upon imaging optical element 350, each at a different transverse location on the element.

In the example shown in FIG. 3, a similar polarization decomposition approach is utilized for pump beam #2, 329. The result of this operation is that four co-polarized beamlets impinge upon the common imaging optic 350 in the form of four spots. These four beamlets are focused by the optical element into the Raman light-pipe 330, resulting in an ensemble of four co-polarized pump beams.

The signal beam 310 is spatially distinct relative to the pump beams and propagates nominally collinearly along the optical axis of the system. In this case, the multiplexing optic 350 can merely pass the signal beam without any wavefront modification. Hence, the signal beam can be directed to propagate through a center hole in the optical element 350, without being focused by the input optic, obviating the need for a dichroic combiner. In some case, a spectral multiplexing operation may be useful in augmenting the spatial multiplexing function of optic 350, in which case, an optional dichroic 313 can be placed in the system 300 as shown.

Figure 4:
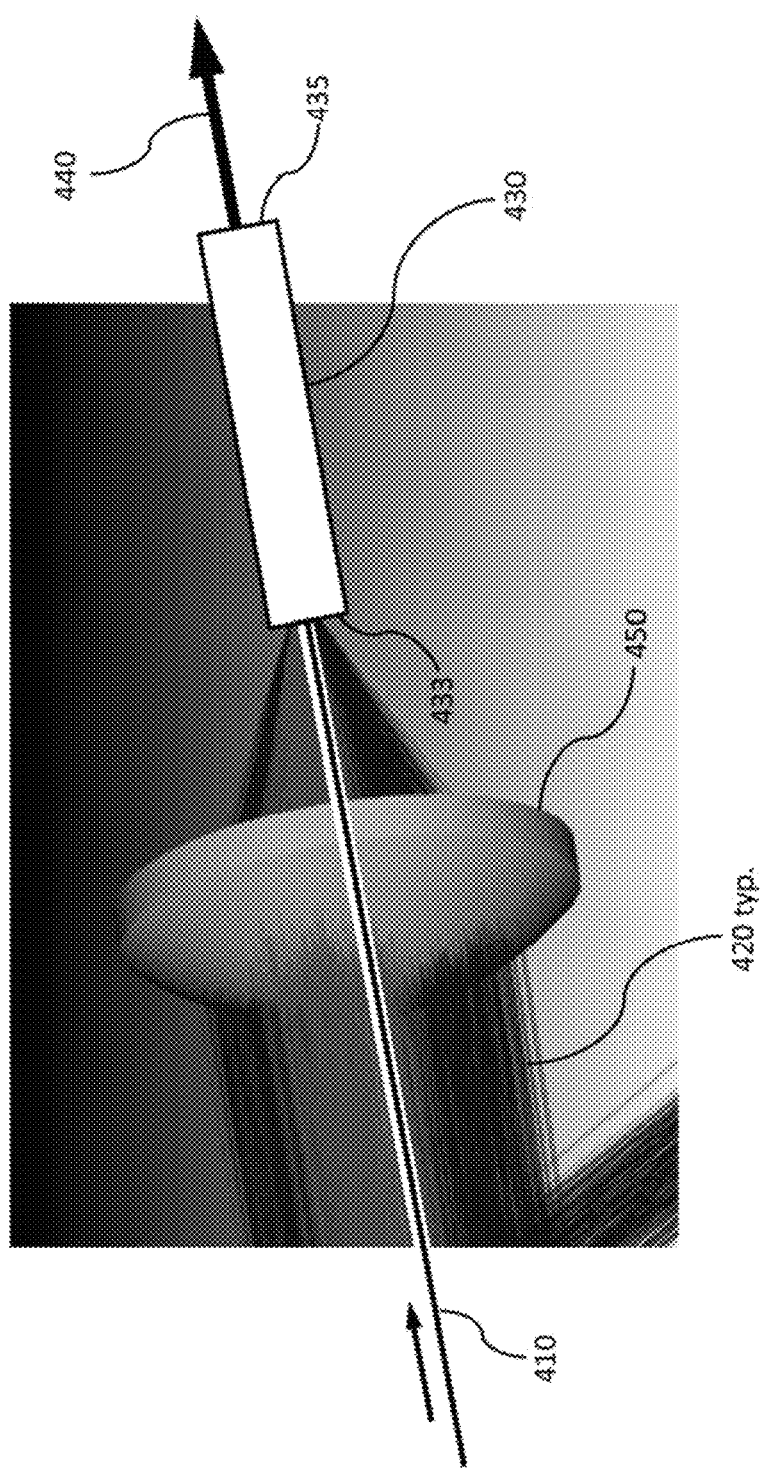
FIG. 4 depicts a multiple-pump-beam input optical element.

FIG. 4 shows a close-up view of the region of the spatial multiplexing element and the Raman converter light-pipe of FIG. 3. Shown here are the four distinct pump incident beams 420, the signal (seed) input beam 410, the focusing optical element 450, and the Raman crystal 430. Also shown is the entrance face 433 of the crystal, through which the signal and pump beams all enter the medium, as well as the exit face 435 of the crystal, through which the output, amplified and intensified signal beam 440 emerges.

Careful engineering of the pump and signal lasers can ensure consistent, temporally square, nanosecond pulses in both the signal and pump lasers, mitigating efficiency degradations due to temporal edge effects. Further, the light-pipe that guides the pump beam array will permit the pump and signal beams to interact multiple times through the volume of the crystal, leading to good integrated spatial overlap and, correspondingly, efficient energy extraction, which is consistent with recent cw cladding pumped Raman fiber amplifier results that achieved 85% slope efficiency [Ji2009]. A embodiment point-design of the system is shown next.

Point-Design Embodiment

Basic Details

Figure 5:
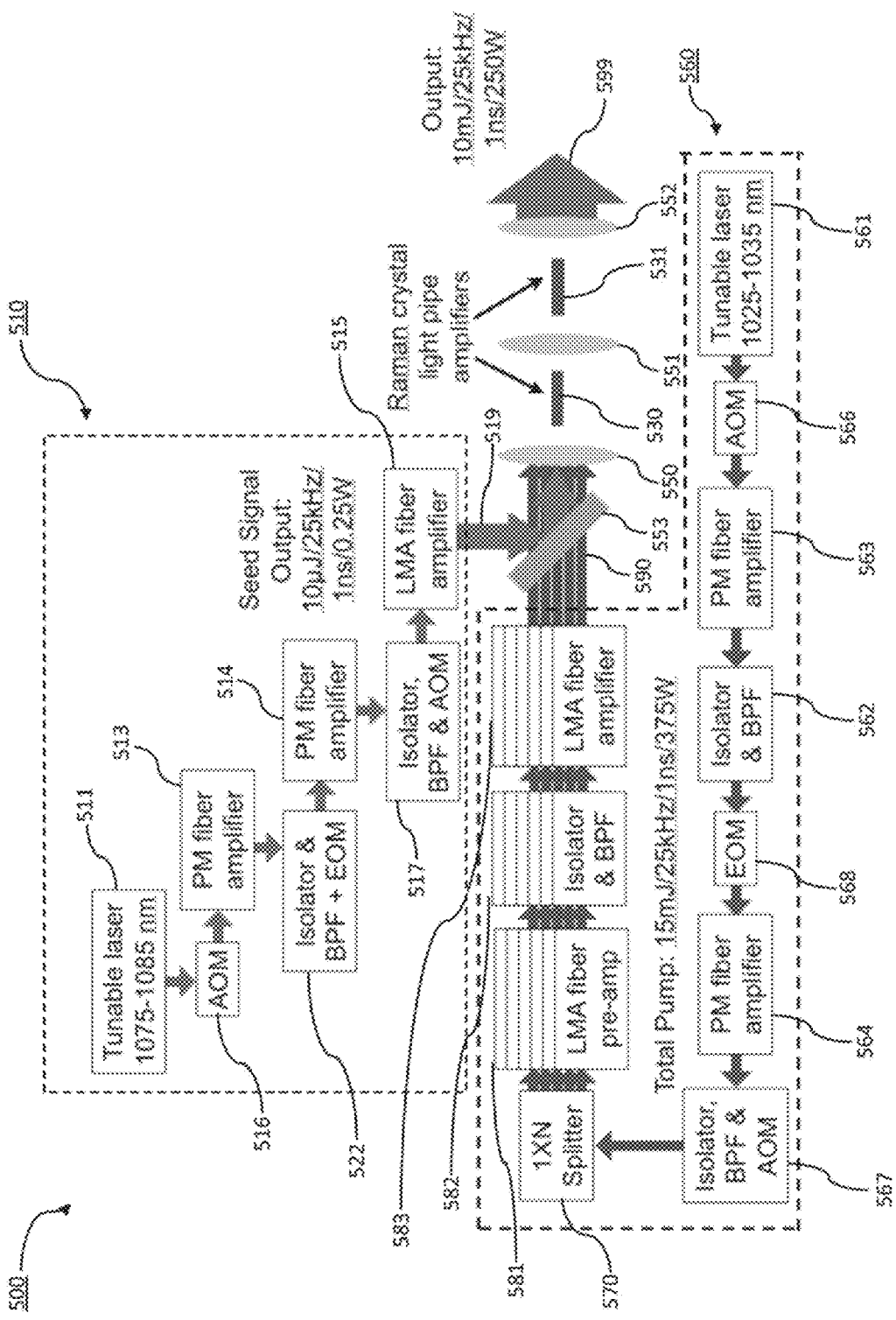
FIG. 5 illustrates a point design of a Raman beam combining system.

The basic details of our point-design embodiment 500 is shown in FIG. 5, in which we introduce the reader to the basic components and operating principles of the system. (We offer a more detailed description of the system 500 in a subsequent section below, which is presented after a review of the physical mechanisms and optical competing processes. In what follows, however, a basic description is presented that highlights novel aspects of the invention.)

Returning to FIG. 5, we note that the enhanced Raman conversion system 500 is based upon a pair of crystal line quartz light-pipes, 530 and 531, cascaded in series. This pair of nonlinear materials forms the basic Raman beam combination medium, with a reimaging relay lens 551 at its mid-plane. In this design, each light-pipe is in the form of a long parallelepiped, with square end faces of dimension 700 μm×700 μm in cross-section. The first light-pipe 530 is 17.5 cm in length, which acts as a Raman amplifier with a gain of 100. In this design, there are no deleterious thermal or Kerr lensing effects in this light pipe, as the seed pulse has less than 1 MW of peak power and no significant energy is converted from the pump to the signal beams in this first stage of the system. In addition, the system is designed so that the pump-beams are highly speckled and, therefore do not experience self-focusing or create a Kerr-induced inhomogeneity sufficient to degrade the beam quality.

The second light-pipe 531 is 12.5 cm in length, which acts as a Raman amplifier with a gain of 10×. Essentially all thermal and Kerr self-focusing effects occur in this second stage. Note that for crystalline quartz, the differential index change with temperature, dn/dT, is less than 0 (that is, as the temperature raises, the refractive index decreases). Below, we present a beam propagation method calculation showing that, under these conditions (i.e., dn/dT<0), the Kerr-induced index change can be designed to effectively cancel out (i.e., mutually compensate) the thermal lensing effect in this light-pipe when operated under the proper pulse energy and average power conditions. Based on how these effects scale with spot size and power, we will also present a rationale for how this system may scale to higher energies.

The pump and signal are reimaged partway through the effective Raman gain medium by lens 551 in order to avoid diffraction of the signal along the pump guide edges. Assuming pump conversion efficiencies equal to those obtained in the past, this system enables production of high energy and average power.

The seed signal fiber laser design 510 is based upon the extensive experience at LLNL in injection seed lasers for the National Ignition Facility [Haynam2007] and other systems [Dawson2009]. The system is comprised of a tunable laser 511, which, in this preferred embodiment, is tunable over the range from 1075 nm to 1085 nm. The signal beam undergoes several stages of amplification including a pair of polarization-maintaining fiber amplifier stages (513, 514), and a large mode area final-stage fiber amplifier (515). The seed signal fiber laser final output (519) is well below the limits for stimulated Raman scattering and optical damage. The B-integral (a measure of self phase modulation explained in detail below) for this laser is calculated to be <2.1 radians with an additional B-integral of 1.9 radians accumulated in the Raman beam combining crystals for a total signal temporal B-integral of <4.0 radians. Note that the seed laser system 510 also includes two acousto-optic modulators (560 and 561) and one electro-optic amplitude modulator (522). Collectively, these modulators ensure high-temporal contrast of the seed pulse.

This temporal contrast is further enhanced by the nonlinear nature of the Raman process, leading to a calculated temporal energy contrast of 99.9% in the system. In this point design, the final signal (seed) beam output 519 is comprised of an optical pulse train, with an energy of ≈10 μJoules per pulse, each pulse of which is 1 nsec in temporal extent, at a repetition rate of ≈25 kHz, resulting in an average output power at the Stokes' shifted wavelength of 0.025 Watts.

Turning again to FIG. 5, the point-design embodiment 500 is also comprised of a fiber-based pump laser system 560. The frontend of the pump fiber laser system has a similarly to the signal laser seed system. Namely, the initial stages of the system include a tunable pump laser 561, a pair of polarization-maintaining fiber amplifiers 563 and 568, a pair of A-O modulators 566 and 567, with appropriate optical isolators and filters, 562. At the output of the final A-O modulator 567, the beam is split N ways (8<N<1.6) by element 570, and subsequently amplified to 1-2 mJoules in large-core fiber amplifiers 581 and 583, with midpoint isolation 582 to inhibit parasitics. These final stages that maintain polarization, but do not necessarily maintain high beam quality. A rough design for the final amplifier will be a 100 μm gain core, 400 μm pump cladding and 1.5 m long gain fiber, which enables the production of 1 mJ, 1 ns pulses at 25 kHz with 50% optical-to-optical efficiency and that does not suffer SRS or optical damage. While a B-integral of 6.2 accumulates in these pulses, their phase is not important for the Raman beam combining process; the only issue is to ensure that their spectral width falls within the crystal's Raman gain bandwidth (which, indeed, is the case in our design). In this point-design, the final pump beam output 590 is comprised of an optical pulse train, with an energy of ≈15 mJoules per pulse, each pulse of which is 1 nsec in temporal extent, and at a repetition rate of ≈25 kHz, resulting in an average output power at the pump laser wavelength of ≈375 Watts.

Recall that, in this embodiment, the beam quality of the pump sources is not important since the pump beams are effectively homogenized in the Raman crystal light-pipe. The ensemble of pump beams within the light-pipe will form many fine interference fringes (speckle) within, the crystal along the entire length of the crystal. As the high-quality seed beam propagates through the crystal, the signal beam will traverse many of these random (pump beam) speckle grains, averaging their affect with no significant consequence to the signal beam quality. Given the above point design parameters, the amplified output signal beam 599 is estimated to be in the form of a pulse train, comprised of 10 mJoule pulses, each of ≈1 nsec in duration, at a 25 kHz repetition rate at the wavelength of the seed beam and with high beam quality, similar to that of the incident seed beam. The average output power of the amplified signal beam is estimated to be ≈250 Watts for this simulation.

System Modeling and Simulations

In the following subsection, we present equations that govern nonlinear and thermal focusing in a Raman medium; they show the following:

1. There exists a minimum pump power that ensures that amplification occurs without catastrophic self-focusing.

2. This minimum pump power depends on the ratio of the nonlinear refractive index to the square of the Raman gain coefficient. This suggests a preference for materials having high Raman gain, even at the expense of a higher nonlinear index.

3. In addition, there is a preference for materials having high thermal conductivity, coupled with low dn/dT and low Raman shift (the latter to minimize the quantum defect).

Table 1 below lists pertinent parameters for several candidate Raman beam combining media. We infer several pertinent points by carefully observing the properties listed in the table. First, fused silica is not a promising candidate, due to the large disparity between its Raman amplification and self-focusing lengths. Crystalline quartz, however, is very promising. Like fused silica, it has a modest Raman shift (allowing pump and signal lasers to be made from ytterbium-doped silica fiber lasers, as an example), and it also has the interesting property that dn/dT is negative, suggesting that the Kerr and thermal lenses might be cancelled in a properly engineered system. In most respects, diamond is very attractive, but its large Raman shift exceeds the bandwidth of any likely single amplification media that can be used to develop both the pump and seed laser systems. We note that Diamond's superior Raman gain and thermal conductivity may be exploited in a "more eyesafe" laser system which has pump lasers pulses at 1550 nm (erbium) and signal pulses at 1952 am (thulium).

Based on the above, we propose a design having a crystalline quartz Raman combiner, at pump and signal wavelengths of 1030 nm and 1078 nm, respectively. This candidate gain material is, in fact, used in our point-design embodiment discussed above.

The equations below provide rules-of-thumb for assessing the viability of materials. Based on these rough estimates, these equations cannot assess, however, for longitudinally-dependent phenomena. To address such longitudinally-dependent phenomena, we turn to computational calculations performed for a specific geometry.

| Material | Units | Fused Silica | Quartz, ordinary | Quartz, extraordinary | Diamond |
|---|---|---|---|---|---|
| $n_0$ | — | 1.457 | 1.533 | 1.542 | 2.4 |
| $n_2$ | cm$^2$/W | 3.20E−16 | 4.22E−16 | 4.37E−16 | 2.80E−16 |
| $g_R$ | μm/MW | 0.08 | 0.95 | 6.95 | 8.0 |
| thermal conductivity | W/m/K | 1.38 | 10.7 | 6.2 | 1800 |
| dn/dT | ppm/C | 11.0 | −5.49 | −6.53 | 9.60 |
| Raman shift | Thz | 13.2 | 13.2 | 13.2 | 39.99 |
| Bandwidth | GHz | 700 | 190 | 190 | 75 |
| Damage thresh @ 1 ns | GW/cm$^2$ | 20 | 28 | 28 | 20 |
| Spot diameter for 10 MW | μm | 252 | 213 | 213 | 252 |
| Raman length | cm | 14.39 | 0.866 | 0.866 | 0.0144 |
| Kerr self-focus length | cm | 3.67 | 2.43 | 2.31 | 5.04 |
| Thermal lens length | cm | 0.21 | −2.34 | −1.14 | 104.3 |
| $P_{peak}$ for $z_{Raman} > z_{SF}$ | MW | 307.2 | 2.73 | 2.81 | 0.0002 |
| $n_0$ | — | 1.457 | 1.533 | 1.542 | 2.4 |
| $n_2$ | cm$^2$/W | 3.20E−16 | 4.22E−16 | 4.37E−16 | 2.80E−16 |
| $g_R$ | μm/MW | 0.08 | 0.95 | 0.95 | 8.0 |
| Thermal conductivity | W/m/K | 1.38 | 10.7 | 6.2 | 1800 |
| dn/dT | ppm/C | 11.9 | −5.49 | −6.53 | 9.60 |
| Raman shift | Thz | 13.2 | 13.2 | 13.2 | 39.99 |
| Bandwidth | GHz | 700 | 190 | 190 | 75 |
| Damage thresh @ 1 ns | GW/cm$^2$ | 20 | 28 | 28 | 20 |
| Spot Diameter for 10 MW | μm | 252 | 213 | 213 | 252 |
| Raman length | cm | 14.39 | 0.866 | 0.866 | 0.0144 |
| Kerr self-focus length | cm | 3.67 | 2.43 | 2.31 | 5.04 |
| Thermal lens length | cm | 0.21 | −2.34 | −1.14 | 104.3 |
| $P_{peak}$ for $z_{Raman} > z_{SF}$ | MW | 307.2 | 2.73 | 2.81 | 0.0002 |

Table 1 above shows pertinent parameters for various materials. Spot size was calculated from the damage threshold and characteristic lengths were calculated for a 10 MW peak power pulse at the damage limited spot size. All the lengths scale linearly with spot size so their relative magnitude would not change if the spot size were increased. Thermal calculations assume a 25 kHz pulse repetition frequency, PRF.

In our analysis, we first integrate the standard Raman gain equations assuming an incident signal beam of energy 10 μJ, with a 1ns pulse width (10 kW peak power), which is pumped by an array of synchronized, pulsed sources, of total energy 1.5 mJ, each pulse of which is 1 ns in duration, yielding a combined pump peak power of 15 MW. For this calculation we assume a light pipe with a 0.7 mm (i.e., 700 μm) square aperture and a signal extraction beam with a 300 μm beam waist. The 300 μm beam waist corresponds to a confocal parameter of 20 cm.

Figure 6:
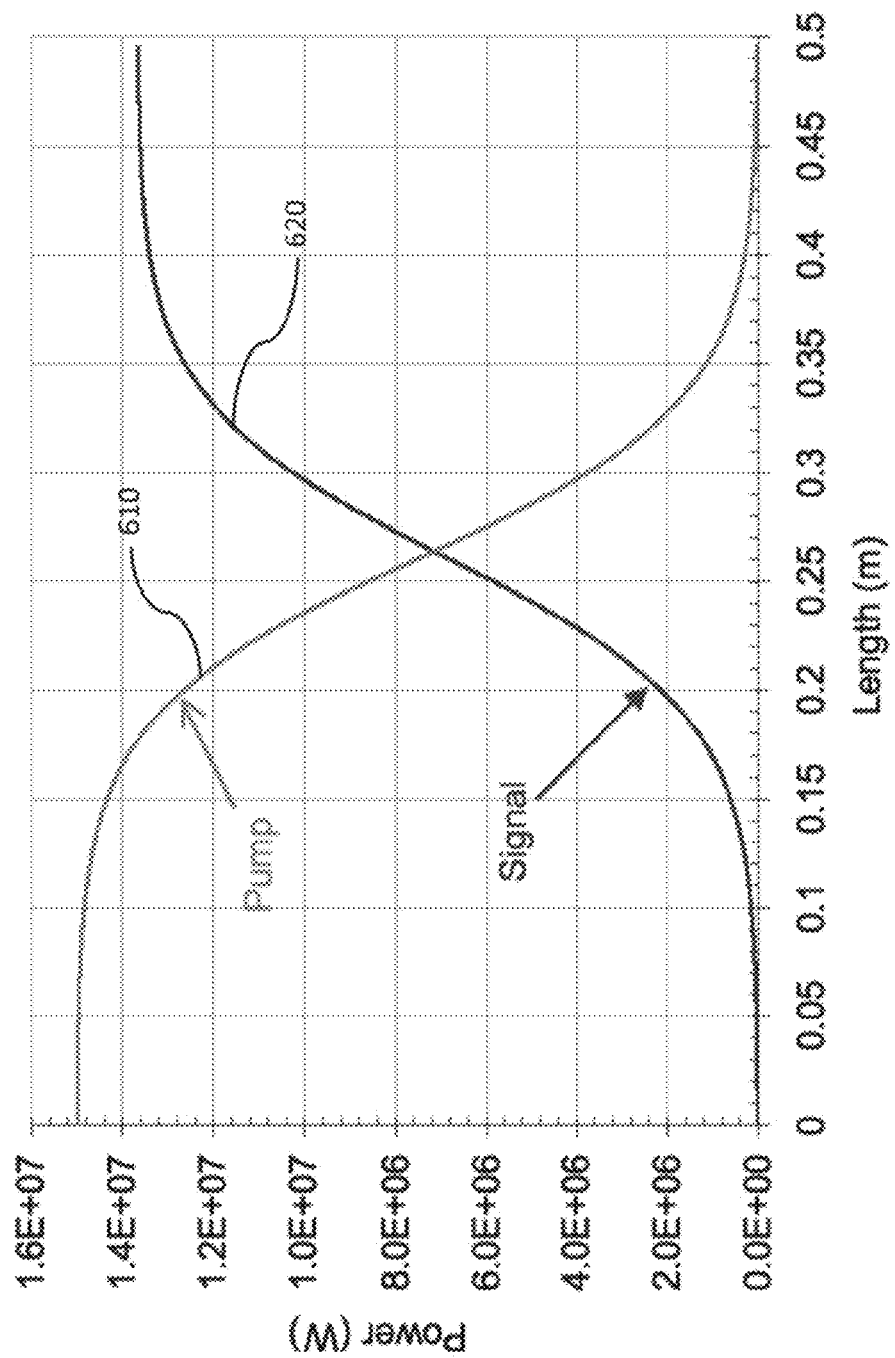
FIG. 6 shows simulation results of a Raman conversion system, assuming an input uniform pump beam of 15 MWatt, in the presence of a 10 kWaatt signal (seed) beam (the latter with a beam waist of 300 μm), co-propagating in a crystal quartz waveguide (50 cm×0.7 mm×0.7 mm) along the ordinary axis.

FIG. 6 depicts the results of our model for the above-noted parameters, where the powers in the pump 610 and signal beams 620 are both plotted as a function of the length along the Raman gain medium. Referring to FIG. 6, it is observed that the power of the seed signal achieves 1000× gain in 30 cm of Raman medium length. Recall from FIG. 5 that we plan to employ two crystals in series, separated by a reimaging lens. This permits us to keep the individual lengths of 17.5 cm and 1.2.5 cm, each of which is less than the 20 cm confocal parameter for the chosen beam size. By maintaining the length of each crystal segment to be less than the confocal parameter assures us that the signal beam will maintain its beam size of 300 μm over the entire length of the light-pipe. Hence, the signal beam will not be impeded by the side-walls of the light-pipe, the latter of which has a cross sectional dimension of 700 μm×700 μm.

If, in the detailed optics design, it becomes necessary to equalize the lengths of the two crystals, the first crystal can be shortened by 5 cm in exchange for increasing the extracting seed laser pulse energy to 40 μJ. Note also that for this choice of beam parameters and light-pipe cross section, the signal output intensity at the exit end face is about ⅓$^{rd}$ the damage limit for quartz, which, for practical purposes, is highly desirable. It turns out that the nominal signal beam output intensity at the end face is 9.8 GW/cm$^2$ whereas the nominal pump beam input intensity is 3 GW/cm$^2$. The lower value for the pump intensity is a result of the fact that the pump beam "fills" the entire 700 μm cross-section of the light-pipe, whereas the signal beam is restricted in size to 300 μm.

As an aside, we point out that we are confident that Raman materials having the chosen aspect ratio can be fabricated; Arun Kumar Sridharan, a member of our team, fabricated crystals having similar aspect ratios during his recent thesis work at Stanford [Sridharan2007a].

We have modeled the interaction of Kerr and thermal self-focusing via the beam propagation method under the following simplifying assumptions:

- The peak intensities and deposited heat are much higher in the second crystal than they are in the first, and we consequently model only the interactions in the second crystal (reasoning that if it behaves well, so will the first).
- The thermal load is deposited uniformly along the crystal and within the extraction beam.
- The pump does not experience self-focusing, since it is spatially distributed uniformly over many higher order modes of the light pipe.
- Power is added to the beam in a linear manner so that the seed beam's power increases roughly linearly in the latter part of the amplification process.

Figures 7A, 7B:
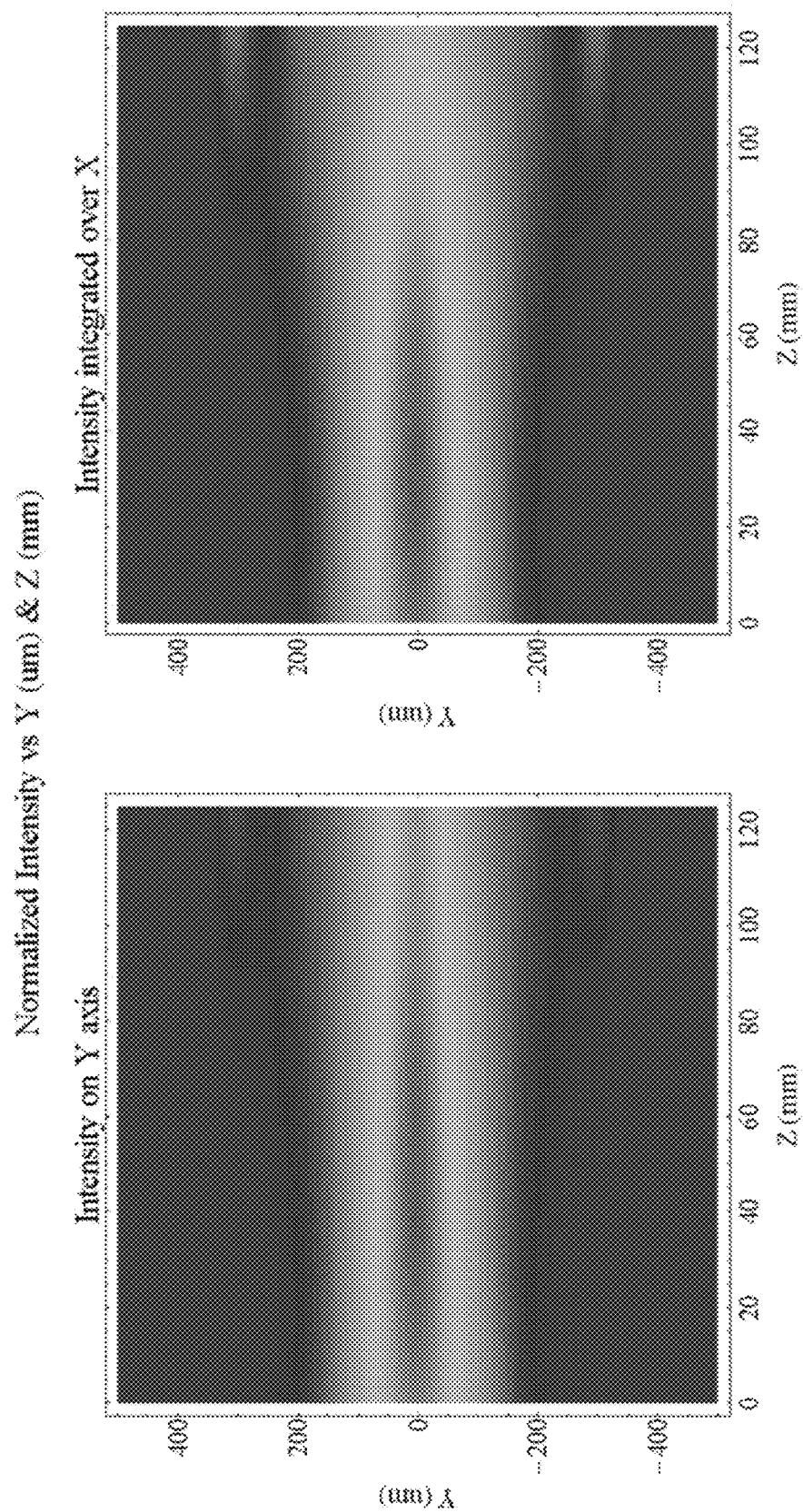
FIG. 7A shows results of a simulation that plots the evolution of the transverse signal beam intensity in the Y-direction, as a function of position along the optical axis (Z-axis) of Raman crystal #2. The horizontal axis is position in millimeters along the optical axis; the vertical axis is transverse position in micrometers along the Y-axis. The plot depicted is an on-axis cross-section; that is, the value of the Y-axis intensity for X=0, as a function of Z.
FIG. 7B shows results of a simulation the plots the evolution of the transverse signal beam intensity in the Y-direction, as a function of position along the optical Z-axis of Raman crystal #2. The horizontal axis is position in millimeters along the optical axis; the vertical axis is transverse position in micrometers along the Y-axis. The plot depicted is the intensity integrated over one transverse dimension; that is, the value of the Y-axis intensity for all values of X, as a function of Z.

Results of our calculations are shown in 2-D plots in FIG. 7A and FIG. 7B, where the signal-beam intensity along one transverse axis (the Y-axis) is potted as a function of the position along the optical axis of the crystal (the Z-axis). The intensity has been normalized to the peak intensity at each Z-axis position. This removes the distorting effect of the 10× signal gain that occurs as the beam traverses the crystal and more clearly illustrates the relative changes in the beam diameter and divergence. As the situation is symmetrical, the X-axis and the Y-axis views are identical.

In FIG. 7A, we show the normalized intensity along the Y-axis as a function of position along the crystal (the Z-axis). In FIG. 7B, on the other hand, we show the intensity, but, for this plot, integrated over the X-axis, as a function of position along the crystal, again, normalized at each position along the optical axis of the crystal (the Z-axis).

Note that FIG. 7B shows a slight divergence of the beam towards the end of the crystal. We attribute this result to the negative thermal lens beginning to win out over the positive Kerr lens from the high peak intensity in the beam (i.e., the mutual compensation of these offsetting nonlinear mechanisms begins to no longer hold). An initial assessment of various lengths (with cross-sections adjusted to yield the correct output energies and Raman conversion efficiencies) suggests the exact length choice is a relatively soft function. This follows, since the thermal lens becomes unacceptable at 7.5 cm whereas catastrophic Kerr self-focusing occurs around 30 cm.

The calculations in this section, along with the previous work in Raman beam combination, strongly suggest the feasibility of this approach for a point-design at the 10 mJ, 1 ns, 250 W level, using a crystalline quartz light pipe as the Raman beam combination medium. A review of a greater range of materials may reveal an even better gain medium. A more rigorous beam propagation method calculation with fewer simplifying assumptions will provide a more thorough and improved result. Nonetheless, the above calculation represents the key physics to first order. We will return to this calculation below in order to computationally assess the beam quality of a preferred embodiment in more detail, after a discussion of the basic physical mechanisms the apply to our system, which immediately follows.

Fundamental Physical Mechanisms of the System

In what follows, we summarize the physics that govern Raman, self-focusing and thermal effects and the constraints that result. This is followed by a summary of competing physical mechanisms that dictate the boundaries of the parameter space within which efficient, stable and practical implementation of the Raman high-brightness conversion system can be achieved, examples of which include amplified spontaneous emission, spectral broadening, modulation instabilities and amplifier design.

Equations Governing Raman, Self-Focusing and Thermal Effects

We have shown above that the Raman effect can provide sufficient conversion efficiency in a crystal length that is sufficiently short so that Kerr and thermal self-focusing effects can be balanced. To this end we present equations to estimate the characteristic lengths of these three physical mechanisms: the Raman conversion efficiency, the Kerr-induced self-focusing effect and the thermal-induced self-focusing effect Raman Amplifier Critical Length The equation for Raman gain is $$P_{out} = P_{in} \cdot \exp\left(\frac{gP_{pump}z}{\pi\omega_0^2}\right)$$

where g is the Raman gain coefficient, $P_{pump}$ is the peak pump power, z is the distance, ω is the beam radius and $P_{in}$ and $P_{out}$ are the input and output peak powers respectively. It is straightforward to rearrange this equation to express the nominal length for a Raman amplifier:

$$z_{Raman} = \frac{\pi\omega_0^2}{gP_{pump}}\ln\left(\frac{P_{out}}{P_{in}}\right) = \frac{\pi\omega_0^2}{gP_{pump}}\ln(G)$$

where G is the linear gain of the amplifier.

Self Focusing Critical Length

Boyd [Boyd2003] gives the critical power for Kerr-induced self-focusing and a simple formula for the focal length of a self-focused beam as $$z_{SF} = \frac{2n_0\omega_0^2}{\lambda_0}\sqrt{\frac{P_{crit}}{P_{pump}}}, \quad P_{crit} = \frac{\pi(0.61)^2\lambda_0^2}{8n_0n_2}$$

where $z_{SF}$ is the self-focusing length, no is the index of refraction of the media, $\lambda_0$ is the wavelength, $n_2$ is the non-linear index and the other parameters are as above. Here $P_{pump}$ is used in place of the peak signal power as the peak signal power cannot exceed the peak pump power. This will result in an estimate of the self focusing length that is slightly shorter than experienced in practice, but permits us to consider only one peak power. Substituting the equation for critical power into the self focusing length equation:

$$z_{SF} = 0.61\omega_0^2\sqrt{\frac{\pi \cdot n_0}{2 \cdot n_2 \cdot P_{pump}}}$$

Characteristic Thermal Length

The thermal lensing effect is determined by the system's average power. If the individual, pulses have peak powers comparable to the pump peak power, then the thermal power deposited is determined by the quantum defect h and duty cycle D:

$$P_{thermal} = \eta D P_{pump}$$

and thermal focal length is then given by $$z_{thermal} = \frac{4\pi\kappa\omega_0^2}{\eta D P_{pump}\frac{dn}{dT}}$$

where κ is the thermal conductivity and dn/dT is the change in refractive index with temperature.

Interaction of Effects

For the system to operate without catastrophic Kerr self-focusing, we require $z_{Raman} < z_{SF}$. This assures us that the desired Raman conversion process occurs over a shorter length of the guide before catastrophic self-focusing ensues. Straightforward calculation establishes a minimum required peak power for the pulse in order to ensure this condition holds:

$$P_{pump} > \frac{2\pi}{(0.61)^2}\frac{(\ln(G))^2}{n_0}\frac{n_2}{g^2}R$$

where R is the ratio of the pump beam area to the signal beam area in the presumed light pipe. In the case of the pump and signal beams having perfect overlap R=1. Also this equation only holds for powers greater than $P_{crit}$.

We note several interesting features of this equation. First, there is an optimal power required to ensure that amplification occurs prior to catastrophic self-focusing; second, that this power depends on the ratio of the non-linear refractive index to the square of the Raman gain coefficient. The quadratic dependence on the Raman gain, relative to the linear dependence of the Kerr coefficient, suggests that materials with a high Raman gain are strongly preferred, even if in the presence of a higher non-linear refractive index.

For the system to operate without catastrophic thermal self-focusing, we require $z_{Raman} < z_{thermal}$. Straightforward calculation establishes the relationship between the parameters:

$$4g\kappa > \eta D \ln(G) \cdot \frac{dn}{dT}$$

This equation suggests an ideal material would have a high thermal conductivity and Raman gain coefficient, along with low dn/dT and Raman quantum defect.

Equations Governing Linear and Nonlinear Artifacts
Amplified Spontaneous Emission Power To estimate amplified spontaneous emission (ASE) in an optical fiber amplifier we employ the equation for ASE power originally derived by Desuvire [Desuvire1994].

$$P_{ASE} = 2n_{sp}(G-1)h\nu \cdot \Delta\nu$$

where $n_{sp}$ is the spontaneous photon number (for ytterbium in silica, it is approximately 1.2) injected per mode of the amplifier, G is the linear gain of the amplifier, hv is the photon energy quantum, and $\Delta\nu$ is the bandwidth under consideration, determined by the amplifier's gain spectrum or a limiting filter. We have successfully used this equation to predict ASE in a number of systems, most notable in our short-pulse injection seed laser work that achieved an ASE power contrast of 78 dB [Dawson2009].

In addition to the above term, temporal power outside the pulse bandwidth must also be taken into account since any modulator employed will have a finite extinction ratio. This leakage power will be amplified by the downstream amplifiers and degrade the pulse's temporal contrast. Once the amplified leakage power from a given modulator is driven to a value below the ASE power from the first amplifier, no further improvement in temporal contrast is achievable from that modulator. Further temporal improvements would be possible only by adding additional modulators at points in the system closer to the output.

Estimating Self Phase Modulation and Kerr Nonlinear Effects

In the pulsed fiber laser systems we have constructed to date, we have found it valuable to keep the B-integral as low as possible. This minimizes non-linear effects such as frequency broadening and modulation instabilities. The B-integral may be calculated from the following equation, $$B = \frac{2\pi n_2 P_{in}}{\lambda A_{eff}} \cdot \int_o^L e^{gz}\,dz = \frac{2\pi n_2 P_{in}}{\lambda A_{eff}} \cdot L_{eff}$$

where $$L_{eff} = \frac{e^{gL}-1}{g}$$

and $$A_{eff} = \pi \omega_0^2$$

where $n_2$ is the Kerr non-linearity, $P_{in}$ is the input power, L is the fiber length, $\omega_0$ is the mode field radius, and g is the amplifier gain per unit length and $\lambda$ is the signal wavelength.

Modulation Instability

Agrawal indicates that modulation instability does not occur for systems in which the GVD parameter $b_2$ is positive as it is at 1 μm in silica fibers (+25 ps$^2$/km). Furthermore, for it to be a significant effect in any system the characteristic dispersion length must be comparable to the characteristic non-linear length. In the systems under discussion here, the characteristic dispersion length is much greater than the characteristic non-linear length.

Frequency Broadening

Our system will begin by generating transform-limited square pulses whose bandwidth is approximately the reciprocal of the pulse width—about 1 GHz for a nanosecond pulse. For a given self phase modulation parameter the output frequency broadening for a Gaussian pulse will follow the relationship below. As discussed above, a square pulse is slightly more forgiving to the frequency broadening impact of self-phase modulation.

$$\Delta\Omega_{out} = 0.86 \frac{2\pi n_2 P}{\lambda A_{eff}} L_{eff} \cdot \Delta\Omega_{in} = 0.86 B \cdot \Delta\Omega_{in}$$

Stimulated Raman Scattering

To estimate stimulated Raman scattering (SRS) limits of an optical fiber component we employ the standard equation for estimating the critical input power and then multiply it by the component gain [Dawson2008].

$$P_{SRS} = \frac{16 A_{eff}}{g_R L_{eff}} e^{g_R L}$$

where $g_R$ is the Raman gain coefficient in fused silica and the other variables are defined in the earlier discussion of the B-integral.

Fiber Laser Amplifier Gain, Power and Energy Calculations

We integrate the standard rate equations in order to estimate performance of our fiber amplifiers. The codes we employ to do this are based upon the following reference [Beach1995a,Beach1995b]. As mentioned above these codes have been benchmarked against fiber laser systems built at LLNL employing designs very similar to the proposed point design.

Optical Damage

Recent measurements [Smith2008] suggest the pulsed optical damage threshold in fused silica is 4750 W/μm$^2$. To this end, we can validate the output of any of the fiber amplifier is below the damage threshold by validating the exit mode field area times the damage threshold is greater than the output peak power.

Details of an Embodiment
Overview

The section above is primarily devoted to the details of the Raman beam combining approach. We now review the fiber laser systems in detail, considering the evolution of pulses through the system and an analysis of cumulative linear and nonlinear effects, component by component, including effects on pulse bandwidth and an estimate of amplified spontaneous emission. After reviewing the fiber laser design we consider the effect of the Raman amplification on pulse parameters, and compute the system's final performance.

Linear and nonlinear system artifacts are calculated by the equations presented for the fiber lengths, core diameter and pulse energies given in the detailed system descriptions below.

Before proceeding, we note that we have constructed and deployed, in working scientific systems, fiber lasers equivalent to the system depicted in FIG. 5, up to the final fiber pump amplifiers, and have additionally built versions of 50 μm core, 250 μm clad amplifiers that emit 1 mJ, 7 ns pulses at 2 kHz (not published). In all cases, we found that the equations considered in this section's appendix successfully predicted system performance. Hence, for the details that follow, FIG. 5 provides reference of the system 500 elements herein, including the signal beam subsystem 510, the pump beam subsystem 560 and the Raman conversion subsystem, the latter including the Raman light-pipes 530 and 531, midplane Raman light-pipe reimaging optics 551, spatial multiplexing input optics 550, output optics 552 and (the optional) optical beam splitter/dichroic element 553.

Description of the Three Subsystems

The consideration required to achieve optimal system performance involve, but are not limited to, the selection of the Raman crystal parameters, such as its ability to tolerate significant thermal loading without generating beam distortions, its robustness against Kerr-induced self-focusing, operation well below optical damage limits, as well as the ability to provide a significantly high Raman gain that results in efficient conversion of the pump wavelength to the Stokes wavelength. Our invention enables an appropriate crystal to be designed and manufactured, resulting in a laser system with significantly better performance than that obtainable by prior inventions. The subsystem and device callouts below refer to those indicated in FIG. 5.

Subsystem 510: Injection Seed Laser at 1078 nm

Before proceeding, note that the 1078 nm arm Raman seed (see FIG. 5) is designed to produce high fidelity 10 μJ, 1 ns pulses—minimum bandwidth, negligible nonlinear distortion, and high temporal ASE contrast ratio.

Master Oscillator, 511, 516.

The 1078 nm seed begins as a single frequency, continuous wave (CW) signal, generated by a tunable, fiber-coupled external cavity diode laser 511 having an integrated oscillator. It is followed by an acousto-optic modulator 516 having 6.6 μm polarization maintaining (PM) fiber pigtails and a nominal insertion loss of 3 dB, which slices the CW signal into a 40 ns, 25 kHz pulse train. The AOM output is amplified by a first telecom-like, PM fiber preamplifier having a gain of 26 dB.

Preamp1, 513.

The first preamplifier 513 consists of 10 m of PM ytterbium-doped fiber with a 6.6 μm core and a short wavelength division multiplexer of the same core size coupled to a 500 mW PM-pigtailed, grating-stabilized, 976 nm laser diode.

Cleanup1, 522.

The preamplifier is terminated with a fiber optic connector and launched into an Optics for Research (OFR) assembly that will contain an optical isolator, 5 nm bandpass filter, and possibly a tap for picking off a small amount of light for diagnostics. (OFR devices are not suited for an integrated system. They are convenient for laboratory prototypes, though, and will be replaced by a custom component in the full engineering system.) The output of the OFR bench is coupled to a high extinction ratio electro-optic modulator, presumed to have 1 m, 6.6 μm core pigtails, which reduces the pulse width from its intermediate 40 ns value to 1 ns, with a 40 dB temporal extinction ratio.

Preamp2, 514, 517.

The EOM output is coupled to a second PM preamplifier 514, this one having a 10 μm core, 10 m long double-clad Yb fiber that is pumped with a 8 W multi-mode pump diode coupled through a pump signal combiner (this diode will be run well below its maximum power capability). This amplifier will have a gain of 26 dB at 1078 nm. The output of this amplifier will be terminated with a fiber optic connector and coupled to an OFR bench containing an optical isolator, 5 nm bandpass filter and a second acousto-optic modulator 517. The second AOM will limit ASE build-up to a 40 ns temporal window around the main pulse.

Final Amp, 515:

The output of the OFR bench will be coupled to the input of a final large mode area, PM fiber amplifier 515, consisting of a 1.5 m length of 40 μm core diameter Crystal Fibre Ytterbium-doped, polarizing optical fiber. This fiber will be part of an assembly purchased from Crystal Fibre that includes a mechanical pump signal combiner and an input angle polished SMA connector. Up to two 10 W multimode pump lasers will be spliced into this assembly to provide pump power sufficient to achieve a net gain of 23 dB. We estimate the final output pulse energy of this system to be 0.10 μJ. Table 2 below shows the results of our calculations for the relevant parameters of this system by component.

| Component | Peak Power (W) | Gain/Loss (dB) | Pulse Energy (μJ) | Average Power (mW) | ASE Power (W) | Mode Field Diameter (μm) | Fiber Length (m) | B-integral | SRS Threshold (W) |
|---|---|---|---|---|---|---|---|---|---|
| Tunable Laser | 0.01 | — | — | 10 | — | — | — | — | — |
| Acousto-optic modulator (AOM, Pulse-Width: 40 ns) | 0.005 | −3 | 0.0002 | 0.005 | — | 6.6 | 1 | — | 5475 |
| PM Fiber Amplifier | 2 | 26 | 0.08 | 2 | 0.0027 | 6.6 | 10 | 0.017 | 3285 |
| Isolator and 5 nm Bandpass Filter | 1 | −3 | 0.04 | 1 | 0.00022 | N/A | 0 | — | N/A |
| Electro-optic modulator (EOM, | 0.5 | −3 | 0.0005 | 0.0125 | 5E−05 | 6.6 | 1 | 0.004 | 5475 |

-continued

| Component | Peak Power (W) | Gain/ Loss (dB) | Pulse Energy (µJ) | Average Power (mW) | ASE Power (W) | Mode Field Diameter (µm) | Fiber Length (m) | B-integral | SRS Threshold (W) |
|---|---|---|---|---|---|---|---|---|---|
| Pulse Width: 1 ns) | | | | | | | | | |
| PM Fiber Amplifier | 200 | 26 | 0.2 | 5 | 0.02045 | 10 | 10 | 0.73 | 7542 |
| Isolator and Bandpass Filter & AOM | 100 | −3 | 0.1 | 2.5 | 0.01023 | N/A | 0 | 0 | N/A |
| LMA Fiber Amplifier | 10000 | 23 | 10 | 250 | 2.04814 | 30 | 1.5 | 1.39 | 401316 |

Table 2 shows relevant optical parameters for 1078 nm injection seed laser. Note that ASE power is peak and exists as 40 ns pedestal around the main 1 ns pulse, and is not a CW background.

Reviewing Table 2, we see that the stimulated Raman scattering (SRS) threshold is never exceeded in any of the components. The total accumulated B integral in the system is roughly 2.1, mostly accumulated in the final amplifier. The ASE column shows a peak ASE power of 2 W. However, this is contained in a 40 ns temporal window (by the last AOM) about the main pulse and thus constitutes <1% of the total amplifier output power. The B of 2.1 will broaden the nominal initial 1 GHz pulse bandwidth to 1.8 GHz based upon the simple formulae contained in Section III.D.5. In summary, we calculate the following parameters for the injection seed laser output.

Pulse Energy: 10 µJ
Pulse Duration: 1 ns
Average Output Power: 250 mW
Beam Quality: $M^2 < 1.1$ (based upon prior measurements of the proposed fiber)
Pulse Temporal Contrast: >99% of power in main pulse
Pulse Bandwidth: >95% of power in 1.8 GHz bandwidth
Wavelength: 1078 nm, tunable from 1075.5 nm-1080.5 nm limited by ASE filter.

The pulse temporal contrast will be further improved by the Raman beam combination subsystem, as appreciable Raman gain cannot exist outside the pumps' ins pulse duration. The proposed system operates well below pulse energies we have previously obtained from similar fibers, so we do not anticipate issues with optical damage. The amplifier gains, average power, pulse energies and pump power are also consistent with the combination of our internal rate equation codes and past experience with similar amplifiers.

Subsystem 560: Pump Lasers

Before proceeding, note that the fifteen 1030 nm, 1 mJ, ns lasers (see FIG. 5) are simply designed to produce appropriate pulses—pulses that can be efficiently generated and combined by the Raman crystals 530 and 531.

Master Oscillator, 561:

A single frequency, continuous wave (CW) signal will be generated by a tunable fiber-coupled external cavity diode laser 561 having an integrated oscillator. An acousto-optic modulator 566 with 6.6 µm polarization maintaining (PM) fiber pigtails and a nominal insertion loss of 3 dB will slice the CW signal into a 40 ns, 25 kHz pulse train.

Preamp 1, 563:

The AOM output will be amplified in a PM fiber amplifier with a gain of 26 dB. This PM fiber amplifier will consist of 4 m of PM ytterbium-doped fiber a 6.6 µm core and a short wavelength division multiplexer of the same core size coupled to a 500 mW PM pigtailed, grating stabilized 976 nm laser diode. Note that these 1030 nm amplifiers use considerably less Yb fiber than the 1078 nm amplifier because the Yb emission cross section is much higher at 1030 nm.

Cleanup 1, 562:

The amplifier gain fiber will be terminated with a fiber optic connector and launched directly into an OFR assembly that will contain an optical isolator, 5 nm bandpass filter and possibly a tap for picking off a small amount of light for diagnostics. The output of the OFR bench will be coupled to a high extinction ratio electro-optic modulator 568 to slice the pulse to 1 ns with a 40 dB temporal extinction ratio and 1 m, 6.6 µm core fiber pigtail.

Preamp2, 564:

This unit will be coupled to a PM fiber amplifier 564 with a 20 µm core, 3 m long double-clad Yb fiber that is pumped with an 8 W multi-mode pump diode coupled through a pump signal combiner (this diode will be run well below its maximum power capability). This amplifier will have a gain of 30 dB at 1030 nm.

Cleanup2, 567:

The output of this amplifier will be terminated with a fiber optic connector and coupled to an OFR bench containing an optical isolator, 5 nm band bass filter and a second acousto-optic modulator. The second AOM will limit ASE build-up to a 40 ns temporal window around the main pulse.

Fanout, 570:

The output of the OFR bench will be split by a 50/50 mirror and coupled to two 1×8 PM fiber splitters. The splitters will be constructed from concatenated PM fiber 50/50 couplers with minimal fiber length between units (~0.5 m, a given path will have 2 m of fiber). The splitters will be made from 6.6 µm core PM optical fiber.

Final Preamps, 581, 582:

The output of each of 15 arms of the splitter 570 will be coupled to a PM fiber amplifier 581 with a 20 µm core, 3 m long double-clad Yb fiber that is pumped with an 8 W multi-mode pump diode coupled through a pump signal combiner (this diode will be run well below its maximum power capability). The remaining unused arm of the splitter 570 will be employed as a diagnostic port. The outputs of the 20 µm core amplifiers will be terminated with an angle polished connector and coupled to OFR bench 582 containing an isolator and 5 nm spectral filter.

Final Amps, 583:

The final high-energy fiber amplifier will be a custom amplifier made from custom optical fibers. The gain fiber will be nominally a 100 μm core, 0.06 NA, 400 μm pump clad, ytterbium-doped optical fiber with PM stress rods. This is similar in aspect ratio (4:1) to other custom fibers that we have fabricated. It will not retain good beam quality given the core diameter. It will be expensive to fabricate because of the large core and a limited amount of it will be available per run. However, this fiber design is not inconsistent with other R&D fibers that have been made for us and for others in the past. A passive version of this fiber may also need to be fabricated in order to construct a custom pump signal combiner. Three 20 W multimode pump diodes will pump this amplifier for a total accessible pump power of 60 W per amplifier. The gain fiber will be 1.5 m long. The output of each of the fifteen high-energy amplifiers will be 1 mJ per pulse at 25 kHz repetition rate for an average power output of 25 W.

Table 3 below provides the results of our calculations for the relevant parameters of the pump laser system by component from the single frequency tunable laser to the high-energy amplifier of a single path of the beam line. To combine the output of these lasers into a single aperture for focusing into the Raman beam combining crystal we plan to employ a multimode 1×N coupler with 100 μm core, 0.15 NA inputs and 400 μm core, 0.45 NA outputs. We have successfully used such couplers to combine two 1 mJ, 7 ns pulses at a 2 kHz repetition rate. However, damage and average power limits of these devices will need to be better evaluated. A bulk lens duct may be a more robust device. All output peak powers are well below the calculated damage limits. It will also be necessary to ensure this portion of the system retains good polarization holding as the Raman gain is dependent upon the polarization of the pump being aligned with the polarization of the signal.

| Component | Peak Power (W) | Gain/Loss (dB) | Pulse Energy (μJ) | Average Power (mW) | ASE Power (W) | Mode Field Diameter (μm) | Fiber Length (m) | B-integral | SRS Threshold (W) |
|---|---|---|---|---|---|---|---|---|---|
| Tunable Laser | 0.01 | — | — | 10 | — | — | — | — | — |
| Acousto-optic modulator (AOM, Pulse-Width: 40 ns) | 0.005 | −3 | 0.0002 | 0.005 | — | 6.6 | 1 | — | 5475 |
| PM Fiber Amplifier | 2 | 26 | 0.08 | 2 | 0.00065 | 6.6 | 4 | 0.017 | 8213 |
| Isolator and 5 nm Bandpass Filter | 1 | −3 | 0.04 | 1 | 0.00033 | N/A | 0 | 0 | N/A |
| Electro-optic modulator (EOM, Pulse Width: 1 ns) | 0.5 | −3 | 0.0005 | 0.0125 | 1.0E−04 | 6.6 | 1 | 0.004 | 5475 |
| LMA Fiber Amplifier | 500 | 30 | 0.5 | 12.5 | 1.0E−01 | 20 | 3 | 0.167 | 112024 |
| Isolator and 5 nm Bandpass Filter + AOM | 250 | −3 | 0.25 | 6.25 | 5.1E−02 | N/A | 0 | 0 | N/A |
| 1 × 16 Splitter | 2.5 | −20 | 0.0025 | 0.0625 | 0.00051 | 6.6 | 2 | 0.579 | 2737 |
| LMA Preamplifier | 2000 | 29 | 2 | 50 | 1.0142 | 20 | 3 | 0.52 | 112024 |
| Isolator and 5 nm Bandpass Filter | 1000 | −3 | 1 | 25 | 0.5071 | N/A | 0 | 0 | N/A |
| LMA Fiber Amplifier | 1000000 | 30 | 1000 | 25000 | 507.106 | 100 | 1.5 | 5 | 5.79E06 |
| Tunable Laser | 364537 | — | — | 11 | — | — | — | — | — |

Table 3 shows relevant optical parameters for 1030 nm pump lasers. Note that ASE power is peak and exists as 40 ns pedestal around the main 1 ns pulse, and is not a CW background.

Reviewing Table 3, we see that the stimulated Raman scattering (SRS) threshold is never exceeded in any of the components. The total accumulated B integral in the system is roughly 6.3, mostly accumulated in the final amplifier. The ASE column shows a peak ASE power of 507 W. However, this is contained in a 40 ns temporal window (by the last AOM) about the main pulse and thus constitutes <2% of the total amplifier output power. The B of 6.3 will broaden the nominal initial 1 GHz pulse bandwidth to 5.4 GHz according to the equations discussed above.

In summary, we estimate the following parameters for the output of one pump unit:
Pulse Energy: 1.0 mJ
Pulse Duration: 1 ns
Average Output Power: 25 W
Beam Quality: 100 μm spot, 0.06 NA
Pulse Temporal Contrast: >98% of power in main pulse
Pulse Bandwidth: >95% of power in 5.4 GHz bandwidth
Wavelength: 1030 nm, tunable from 1027.5 m-1032.5 nm limited by ASE filter.

The combined outputs of all the pump pulses will have the following properties:
Pulse Energy: 15 mJ
Pulse Duration: <1.05 ns (limited by timing of the beams)
Average Output Power: 375 W
Beam Quality: 400 μm spot, 0.46 NA
Pulse Temporal Contrast: >98% of power in main pulse
Pulse Bandwidth: >95% of power in 5.4 GHz bandwidth
Wavelength: 1030 nm, tunable from 1027.5 m-1032.5 nm limited by ASE filter.

Raman Beam Combination Subsystem, 530, 531:

The design of the Raman beam combination module was discussed above. We showed that the required Raman gain could be achieved by co-propagating a 15 mJ, 1030 nm pump pulse 590 along with a 10 μJ 1.078 nm seed pulse 519 in 700 μm×700 μm cross-section lightpipes. The extracting signal 519 will be focused into the light-pipe with a 300 μm average diameter, slightly larger than the confocal condition. The first light pipe 530 is designed to be 17.5 cm long, and the second light-pipe 531 is 125 cm long. The final output of the Raman light-pipe conversion system is collimated by lens 552, and emerges from the overall system as an amplified, high-fidelity signal beam 599.

Performance of the Point-Design System

The BPM calculation, results of which are shown in FIG. 7A and FIG. 7B (recall above discussion), predicts that the beam neither significantly diverges nor focuses as it is amplified and traverses the crystal.

Figure 8B:
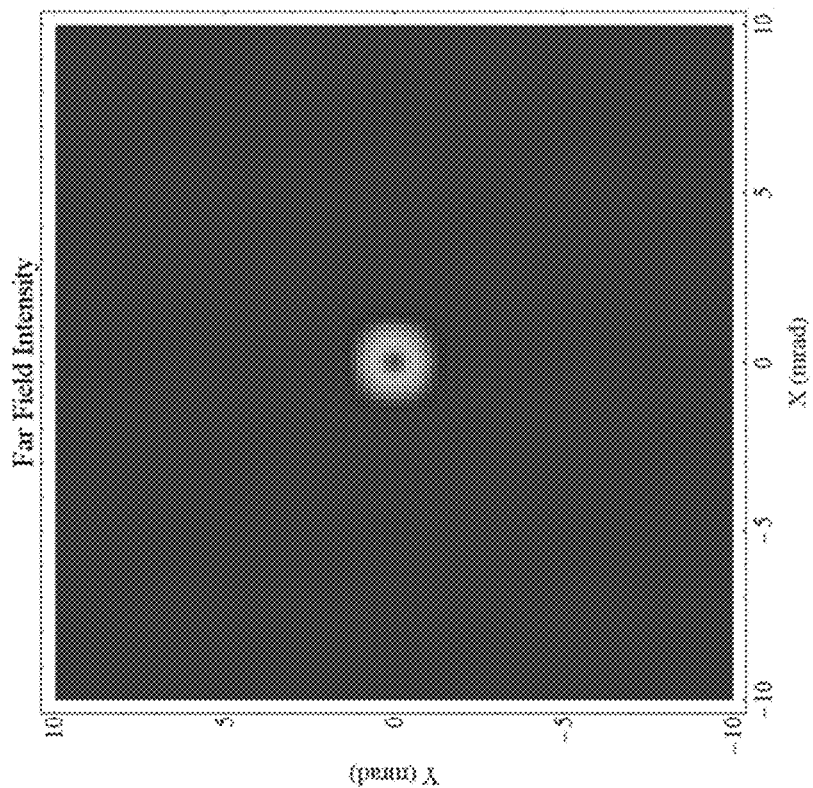
FIG. 8B depicts simulation results of the far-field amplified signal (seed) beam intensity (linear scales) at the output plane of the Raman beam combination system. The calculation was accomplished using the BPM model discussed herein in section III.C. Near and far field beam intensity (linear scales) of the amplified signal at the output of the Raman beam combination system, calculated with the BPM model discussed in section III.C.
Figure 8A:
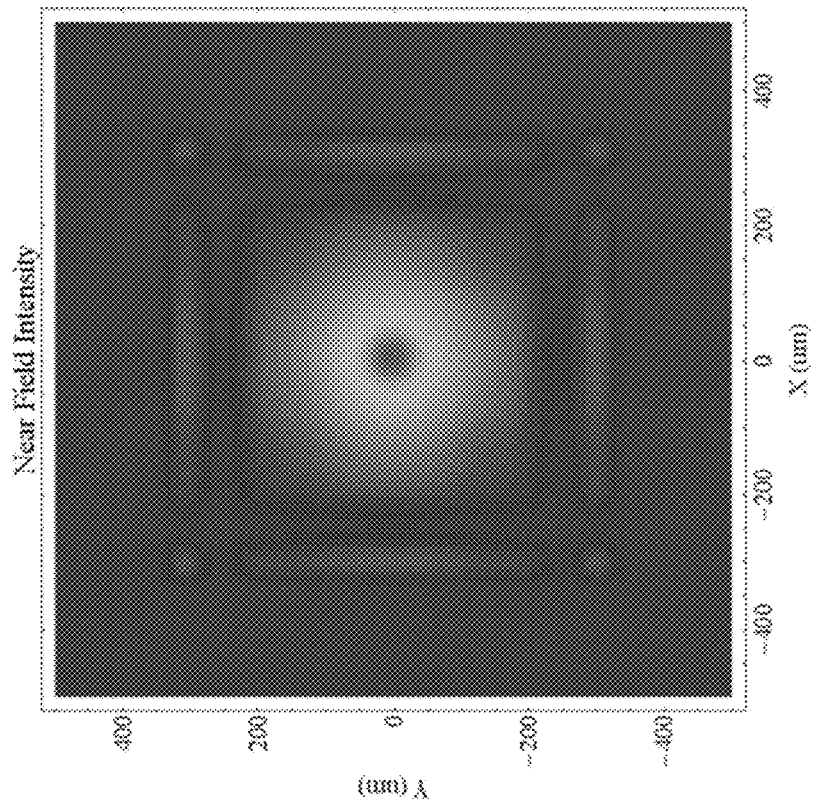
FIG. 8A depicts simulation results of the near-field amplified signal (seed) beam intensity (linear scales) at the output plane of the Raman beam combination system. The calculation was accomplished using the BPM model discussed herein in section III.C.

FIG. 8A and FIG. 8B show results of our simulation of the output beam profiles of the amplified signal 599 that emerges from the overall system. FIG. 8A shows a 2-D plot of the near-field intensity profile of the output beam at the end face of the crystal, whereas FIG. 8B shows a 2-D plot of the far-field beam intensity of the system output. These results will provide the data with which we better quantify the diffraction-limited performance of the system, as discussed next.

Figure 9:
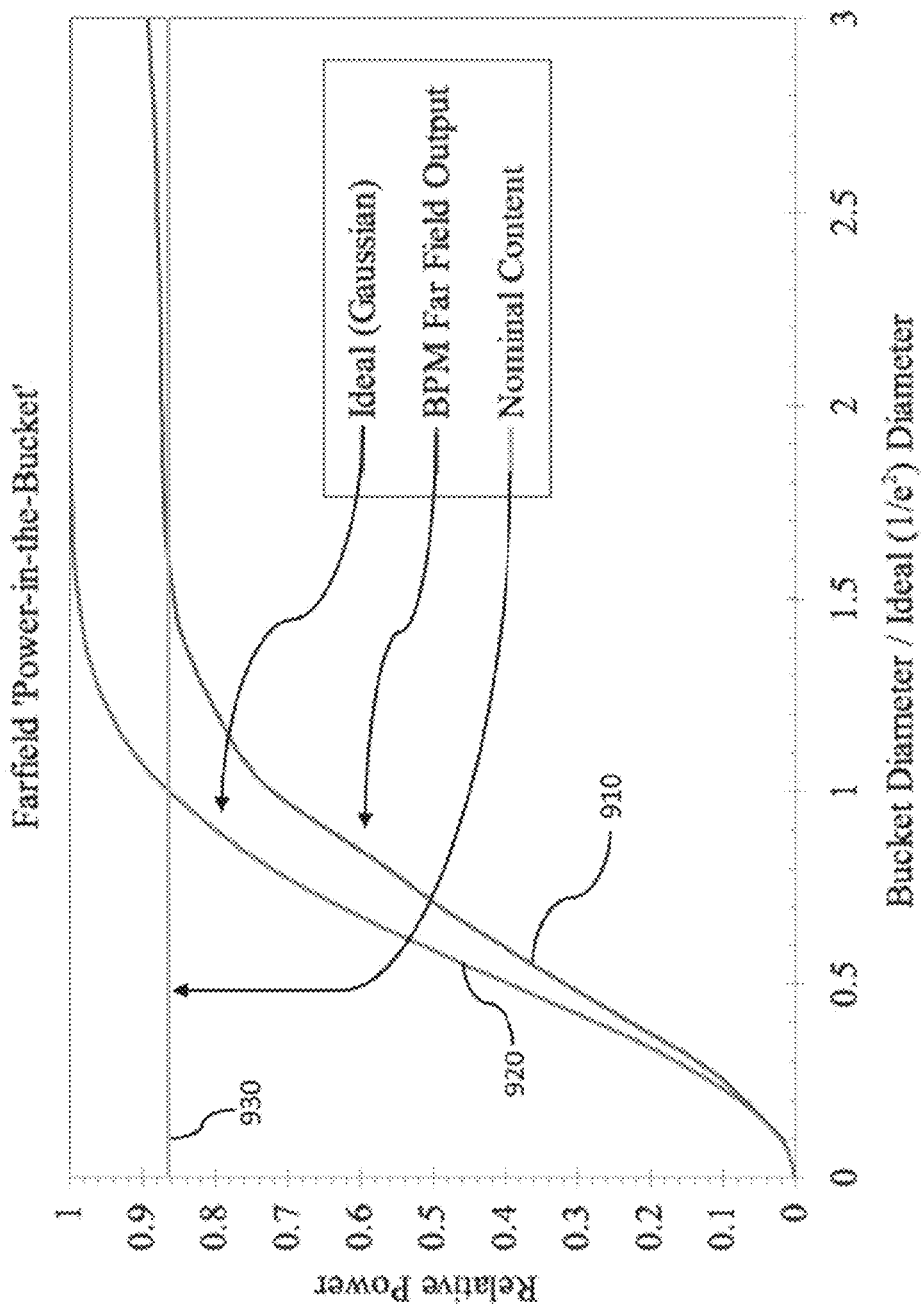
FIG. 9 shows results of a power-in-the-bucket calculation (the normalized on-axis intensity in the far field) of an ideal Gaussian beam and the BPM projected output of the Raman beam combining system using the point design depicted in FIG. 5.

Turning now to FIG. 9, results are shown to more quantitatively assess the beam quality, given the above the intensity profiles. To obtain quantifiable results, the system output profile was integrated to calculate the "power-in-the-bucket" in the far field. Displayed in FIG. 9 is the relative power of the system, for two different cases, both plotted as a function of the normalized "bucket diameter," which is equivalent to a pinhole, whose diameter is scaled to that of an ideal far-field diffraction-limited beam waist. In one case, the power in the bucket is shown for the data derived from our BPM model calculations 910 (recall FIGS. 8A and 8B). For comparison we replaced the near-field profile of Figure SA with an ideal Gaussian beam of the same diameter and projected it to the far field and performed the same power-in-the-bucket integration, curve 920. Also shown is the nominal power content 930, which is a normalization factor, independent of the bucket diameter.

We see from FIG. 9, at the nominal $1/e^2$ point where 85% of the light is in the bucket, the beam has a spot diameter about 1.6× of a diffraction limited Gaussian beam in the far field. However, there is room for improvement. The beam emerging directly from the end-face of the Raman crystal has lower order phase terms that arise from the imperfect interaction of the Kerr and thermal lenses. Further, the beam is clipped slightly which creates a pedestal on the intensity in the far field. For a small power penalty, this beam could be corrected to produce significantly better beam quality. Prior to engaging in an exercise such as this, however, we will have to remove some of the BPM calculation approximations.

For the Raman gain medium with a 300 μm spot size, the calculated SRS limited output for the 1.078 nm beam in Crystal B (recall 531 in FIG. 5) is 23 MW, which is well above the 10 MW expected output. The pump beam has an SRS threshold of 35 MW for Crystal A (recall 530 in FIG. 5), and 49 MW for Crystal B. The total SRS pump limit for the full 30 cm is 20 MW, still comfortably above the 15 MW pump power.

The B-integral for the Raman beam combination module is 0.14 for the Crystal A and 1.76 for the Crystal B, for a total B integral of 1.9. It is to be noted that the B-integral effect can also produce undesirable spatial filamentation. For high energy lasers such as NIF, a rule of thumb is B<2 is sufficient to prevent this effect. Note that the B-integral accumulation in the fiber system is of a temporal nature only, since the fiber acts as a continuous, distributed spatial filter. The equations above predict that the B=1.9 accumulated in the Raman crystal will broaden the pulse bandwidth by an additional factor of 1.6 to 2.9 GHz. However, to gain additional insight, we can more accurately determine the final pulse spectrum computationally.

Figures 10A, 10B:
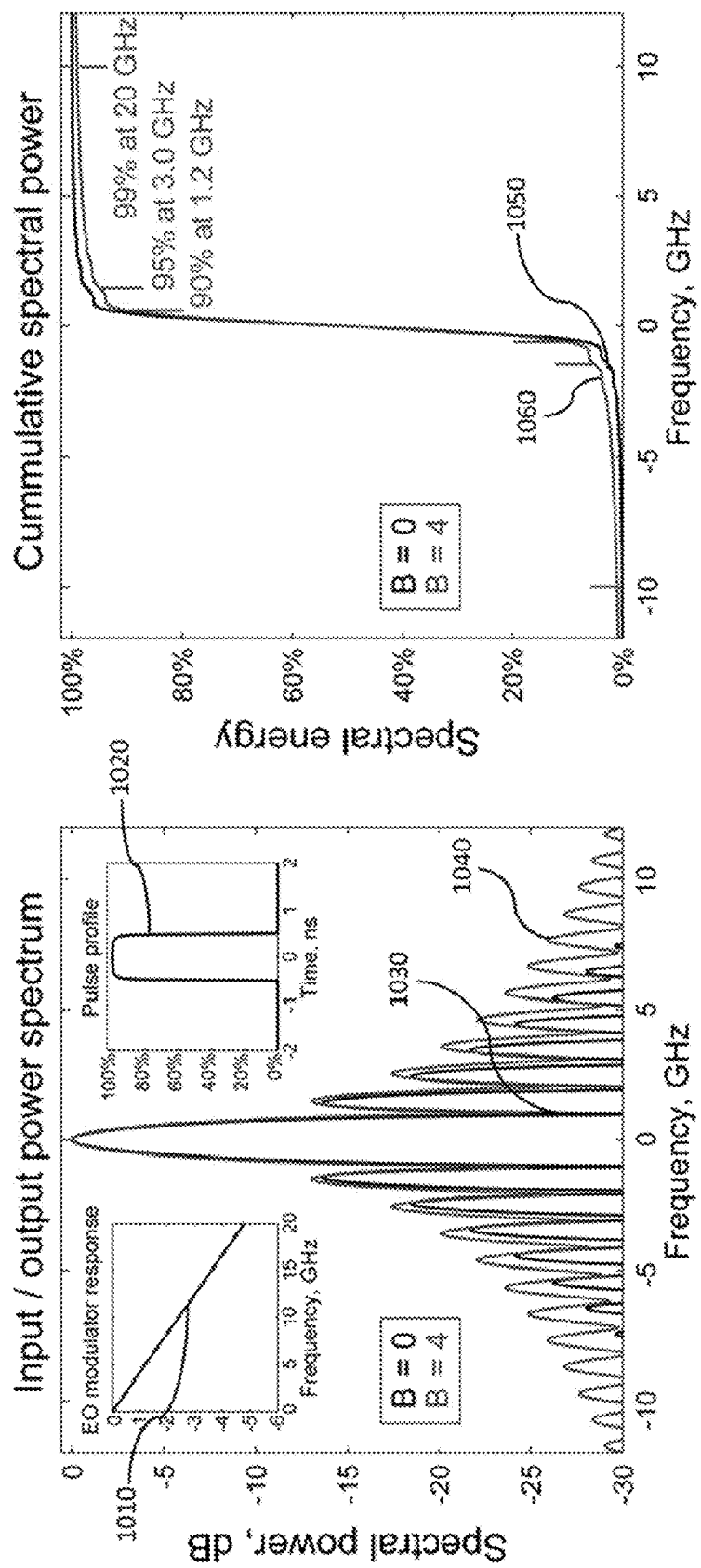
FIG. 10A depicts a simulation of the frequency spectrum of a 1ns optical pulse output beam, as generated by passing a cw beam through an EO modulator, driven by a single 1 ns square-wave electronic drive pulse, with frequency response shown in the left inset and output pulse shown in the right inset. B=0 case (black line), B=4 case (gray line).
FIG. 10B depicts a simulation of the cumulative spectral power, as a function of frequency, as generated under the same conditions as those described with respect to FIG. 10A. As before, it is assumed that a 1 ns optical output pulse is generated by passing a cw beam through an EO modulator, driven by a single 1 ns square-wave electronic drive pulse, with frequency response shown in the left inset and output pulse shown in the right inset. B=0 case (black line), B=4 case (gray line).

Turning now to FIGS. 10A and 10B, a detailed computer simulation of the final pulse power spectrum is shown. Specifically, in FIG. 10A, a plot of the input/output power spectrum is shown; whereas, in FIG. 10B, a plot of the cumulative spectral power is shown, both as a function of frequency. As input to this computation, the EOSpace modulators RF frequency response (i.e., its transfer function) is required, which is shown in the left-hand inset 1010 of FIG. 10A.

To perform the more precise simulation, an ideal 1 ns square-wave pulse is provided as a drive signal input to the modulator. The bandwidth-limited temporal response of our modulator is shown by the pulse in the right-hand inset 1020 of FIG. 10A, which displays the pulse with rounded edges. The Fourier transform of the pulse's temporal response, 1020, provides its transform-limited spectral power content, as shown by the dark curve 1030 in FIG. 10A. This result is equivalent to a system in the absence of nonlinear phase shifts, namely, for a value of zero for the B-integral. To account for the optical nonlinear phase-shift induced by the Raman light-pipe, a peak temporal B-integral of 4 is imposed onto the pulse. Upon repeating the spectral analysis, the resultant spectral power response for the B=4 case is shown by the gray curve 1040 in FIG. 10A. Note that the B=0 response (1030) is more narrowband than the B=4 response (1040), as expected.

Once the spectral content of the pulse is known, we can integrate and normalize the power spectrum to compute the cumulative spectral energy vs. bandwidth, as shown in FIG. 10B. Two cases are depicted in FIG. 10B, both of which utilize the spectral power results obtained from FIG. 10A as input data. In FIG. 10B, the B=0 result 1050 is derived from the B=0 data (1030) from FIG. 10A; whereas, the B=4 result 1060 is derived from the B=4 data (1040).

In the case of the B=4 pulse that emerges from the Raman beam combining system, >90% of the energy is in a 1.2 GHz bandwidth; with >95% of the energy in a 3.0 GHz bandwidth; and, with >99% of the energy in a 20 GHz bandwidth. We note that this is not actually very far off from that in the case of an undistorted pulse. This follows, since the flat-top, square pulses create less spectral bandwidth for a given B accumulation than does an equivalent Gaussian pulse.

The Raman pump outside the main pulse drops to 500 W*15=7.5 kW. We calculate that this peak power will provide 0.027 dB of gain to the 2 W ASE pedestal. Thus the resultant ASE pedestal at the beam combination output will be less than 2.012 W over a 40 ns pulse duration. The peak ASE pulse energy is 80 nJ, which is 0.0008% of the main pulse energy.

Thus we predict that the Raman amplified signal output will have the following properties:
  Pulse Energy: 10.0 mJ
  Pulse Duration: <1.0 ns
  Average Output Power: 250 W
  Beam Quality: <1.6× the diffraction limit (FIG. 6)
  Pulse Temporal Contrast: >99.9% of power in main pulse (ASE analysis above)
  Pulse Bandwidth: >99% of power in 20 GHz bandwidth (FIG. 10B)
  Wavelength: 1078 nm, tunable from 1075.5-1080.5 nm.

Discussion and Summary

Early Raman beam combining results encountered issues with weak stray beams due to stationary fringe patterns formed by the pump beams as they were crossed in the Raman gain medium, thereby creating a Kerr-induced phase grating that, in turn, created weak "replicas" of the signal beam. This did not degrade output beam quality, as these replicas are easily blocked. However, there is the minor concern that these beams may degrade the output power of the overall system. In our case, the pump beams originate from the same seed source and are thus mutually coherent and share a common frequency, implying that the combined beam will have spatial, but not temporal, modulation.

Note that the pump beams will be homogenized prior to reaching the Raman beam combiner and will traverse the Raman crystals as high-frequency speckle patterns that change rapidly along the length of the crystal. (Beveling the crystal along its length will overcome this.) To calculate the index non-uniformity due to Kerr effects, consider that $n_2$, which is equal to the product of the Kerr non-linearity (4.2× $10^{-16}$ cm²/W) times the pump intensity (3 GW/cm²), will convert this speckle into random refractive index variations of <2×$10^{-6}$—this minor inhomogeneity will average to zero over the length of the crystal.

Another potential concern is that the 15 MW pump pulse in the quartz crystal will self-focus and cause catastrophic damage. Note, however, that the often-quoted 4 MW self-focusing limit in glass is calculated for a Gaussian beam profile. By contrast, given the presence of highly speckled beams, as is the case for the highly multi-mode pump beams in our case, can propagate far above this threshold without damage. For example, there are numerous reports in the literature of 20 MW peak pulses from Nd:YAG lasers delivered to work surfaces via multimode silica fibers [Schmidt-Uhlig2001].

In conclusion, our rate equation models predict that, for 25 mW of average input (seed) power, and a desired requirement to obtain 25 W of average output power, the required average pump power for the amplifier will be 50-55 W. This yields an optical-to-optical conversion efficiency of ~50%. While continuous-wave ytterbium-doped silica fiber lasers can indeed produce 85% optical to optical slope efficiency, such high efficiencies are not in the realm where pulsed fiber lasers operate. In our experience and throughout the literature, one finds that pulsed systems in the 10 kHz repetition rate regime typically produce optical-to-optical conversion efficiencies closer to 50%, rather than 90%. Lower repetition rate systems perform even worse. This is important to consider when predicting next-generation system performance. These amplifiers will generate the majority of the optical power. We predict that diode sources will be 50% efficient, with a further 50% efficiency in the amplifiers. Given a minimum Raman beam combination efficiency of 65%, the predicted efficiency of the high-power portion of the system is 16%. A subsequent goal will be a Raman beam combination efficiency of 85% bringing the overall high-energy system efficiency to 21%.

REFERENCES

J. Anderegg, S. Brosnan, M. Weber, H. Komine, and M. Wickham, "8-W coherently phased 4-element fiber array," Proc. SPIE, vol. 4974, pp. 1-6, 2003.

S. J. Augst, T. Y. Fan, and A. Sanchez, "Coherent beam combining and phase noise measurements of ytterbium fiber amplifiers," Opt. Lett., vol. 29, pp. 474-476, 2004.

R. J. Beach, "CW Theory of Quasi-Three Level End-Pumped Laser Oscillators," Optics Communications vol. 123, pp. 385-393, 1995.

R. J. Beach, "Optimization of Quasi-Three Level End-Purmped Q-Switched Lasers," IEEE J. Quantum Electronics, vol. 31, pp. 1606-1613, 1995.

E. J. Bochove, S. A. Shakir, "Analysis of a Spatial-Filtering Passive Fiber Laser Beam Combining System," IEEE Journal of Selected Topics in Quantum Electronics, vol. 15, pp. 320-327, 2009.

R. W. Boyd, Nonlinear Optics, Second Edition, Elsevier, 2003.

R. Chang and N. Djeu, "Amplification of a diffraction-limited Stokes beam by a severely distorted pump," Opt. Lett. vol. 8, pp. 139-141, 1983.

R. Chang, R. Lehmberg, M. Duignan, N. Djeu, "Raman beam cleanup of a severely aberrated pump laser," Quantum Electronics, IEEE Journal of, vol. 21, pp. 477-487, 1985.

B. Chann, R. K. Huang, L. J. Missaggia, C. T. Harris, Z. L. Liau, A. K. Goyal, J. P. Donnelly, T. Y. Fan, A. Sanchez-Rubio, and G. W. Turner, "Near-diffraction-limited diode laser arrays by wavelength beam combining," Opt. Lett. vol. 30, pp. 2104-2106, 2005.

R. Chulkov, A. Grabtchikov, D. Busko, P. Apanasevich, N. Khilo, and V. Orlovich, "Beam quality improvement at Raman conversion of multimode conical beam," J. Opt. Soc. Am. B vol. 23, pp. 1109-1116, 2006.

C. A. Codemard, P. Dupriez, Y. Jeong, J. K. Sahu, M. Ibsen, and J. Nilsson, Opt. Lett. vol 30, p. 2290, 2006.

C. J. Corcoran and R. H. Rediker, "Operation of five individual diode lasers as a coherent ensemble by fiber coupling into an external cavity," Appl. Phys. Lett., vol. 59, pp. 759-761, 1991.

C. J. Corcoran, F. Durville, K. A. Pasch, "Coherent Array of Nonlinear Regenerative Fiber Amplifiers," IEEE Journal of Quantum Electronics, vol. 44, pp. 275-282, March 2008.

J. W. Dawson, M. J. Messerly, R. J. Beach, M. Y. Shverdin, E. A. Stappaerts, A. K. Sridharan, P. H. Pax, J. E. Heebner, C. W. Siders and C. P. J. Barty, "Analysis of the scalability of diffraction limited fiber lasers and amplifiers to high average power," Optics Express, vol. 16 pp. 13240-13266, 2008.

J. W. Dawson, M. J. Messerly, H. H. Phan, J. K. Crane, R. J. Beach, C. W. Siders, C. P. J. Barty, "High-Energy, Short-Pulse Fiber Injection Lasers at Lawrence Livermore National Laboratory," IEEE Journal of Selected Topics in Quantum Electronics, vol. 15, no. 1, pp. 207-219, 2009.

E. Desuvire, Erbium-Doped Fiber Amplifiers: Principles and Applications, Wiley, New York, 1994.

J. M. Eggleston, "Solutions to Raman-scattering equations in the presence of multiple equivalent incoherent multiaxial-mode laser beams," J. Opt. Soc. Am. B vol 3, 1390-1393, 1986.

J. Eggleston, "Steady-state coherent Raman beam combining with multiaxial mode lasers," IEEE Journal of Quantum Electronics, vol. 22, no. 10, pp. 1942-1952, 1986.

T. Y. Fan, "Laser beam combining for high-power, high-radiance sources," IEEE Journal of Selected Topics in Quantum Electronics, vol. 11, pp. 567-577, 2005.

A. Flusberg and D. Korff, "Wave-front replication versus beam cleanup by stimulated Raman scattering," J. Opt. Soc. Am. B, vol. 4, pp. 687-690, 1987.

S. Fulghum, D. Klimek, A. Flusberg, D. Trainor, C. Duzy, H. Hyman, J. Daugherty, and D. Korff, "Stokes phase preservation during Raman amplification," J. Opt. Soc. Am. B, vol. 3, pp. 1448-1.459, 1986.

E. V. George, J. C. Swingle "Raman Accumulator as a fusion laser driver," U.S. Pat. No. 4,529,943, Jul. 16, 1985.

D. J. Gibson, S. G. Anderson, S. M. Betts, M. J. Messerly, H. H. Phan, M. Y. Shverdin, F. V. Hartemann, C. W. Siders, C. P. J. Barty, "Demonstration and Optimization of a Drive Laser for an X-Band Photoinjector", Proceedings of the 2009 Particle Accelerator Conference (Vancouver, Canada, May 2009), p. TU6RFP047, 2009.

D. J. Gibson, F. Albert, S. G. Anderson, et al., "Design and operation of a tunable MeV-level Compton-scattering-based gamma-ray source," submitted to Phys. Rev. Spec. Top.:Accel. and Beams, 2009.

J. Goldhar and J. Murray, "Intensity averaging and four-wave mixing in Raman amplifiers," IEEE J. Quantum Electron., vol. QE-18, pp. 399-409, 1982.

C. Haynam, P. Wegner, J. Auerbach, M. Bowers, S. Dixit, G. Erbert, G. Heestand, M. Henesian, M. Hermann, K. Jancaitis, K. Manes, C. Marshall, N. Mehta, J. Menapace, E. Moses, J. Murray, M. Nostrand, C. Orth, R. Patterson, R. Sacks, M. Shaw, M. Spaeth, S. Sutton, W. Williams, C. Widmayer, R. White, S. Yang, and B. Van Wonterghem, "National Ignition Facility laser performance status," Appl. Opt, vol. 46, pp. 3276-3303, 2007.

J. Goldhar, M. Taylor, J. Murray, "An efficient double-pass Raman amplifier with pump intensity averaging in a light guide," IEEE Journal of Quantum Electronics, vol. 20, pp. 772-785, 1984.

J. C. van den Heuvel, "Numerical modeling of stimulated Raman scattering in an astigmatic focus," IEEE Journal of Quantum Electronics. vol 28, p. 378, 1992.

J. C. van den Heuvel, F. J. M. van Putten, and R. J. L. Lerou, "Experimental and numerical study of stimulated Raman scattering in an astigmatic focus," IEEE Journal of Quantum Electronics, vol. 29, p. 2267, 1993.

J. Heuvel, "Numerical study of beam cleanup by stimulated Raman scattering," J. Opt. Soc. Am. B vol. 12, 650-657, 1995.

A. A. Ishaaya, N. Davidson, L. Shimshi, and A. A. Friesem, "Intracavity coherent addition of Gaussian beam distributions using a planar interferometric coupler," Appl. Phys. Lett., vol. 85, pp. 2187-2189, 2004.

R. R. Jacobs, J. Goldhar, D. Eimerl, S. B. Brown, and J. R. Murray, "High-efficiency energy extraction in backward-wave Raman scattering" App. Phys. Lett. vol. 37, p. 264, 1980.

J. Ji, C. Codemard, M. Ibsen, J. K. Sahu, and J. Nilsson, IEEE J. Sel. Top. Quantum Electron. vol. 129, 2009.

H. Komine, W. H. Long, Jr., E. A. Stappaerts, and S. J. Brosnan, "Beam cleanup and low-distortion amplification in efficient high-gain hydrogen Raman amplifiers," J. Opt. Soc. Am. B vol. 3, pp. 1428-1446, 1986.

Y. Kono, M. Takeoka, K. Uto, A. Uchida, and F. Kannari, "A coherent all-solid-state laser array using the Talbot effect in a three-mirror cavity," IEEE J. Quantum Electron., vol. 36, pp. 607-614, 2000.

D. Korff, E. Mazur, C. Duzy, and A. Flusberg, "Raman conversion using crossed broadband pump beams and bisecting Stokes," J. Opt. Soc. Am. B vol. 3, pp. 1333-1337, 1986.

J. R. Leger, G. J. Swanson, and W. B. Veldkamp, "Coherent laser addition using binary phase gratings," Appl. Opt., vol. 26, pp. 4391-4399, 1987.

J. R. Leger, M. L. Scott, and W. B. Veldkamp, "Coherent addition of AlGaAs lasers using microlenses and diffractive coupling," Appl. Phys. Lett., vol. 52, pp. 1771-1773, 1988.

M. L. Minden, H. Bruesselbach, J. L. Rogers, M. S. Mangir, D. C. Jones, G. J. Dunning, D. L. Hammon, A. J. Solis, and L. Vaughan, "Self-organized coherence in fiber laser arrays," Proc. SPIE, vol. 5335, pp. 89-97, 2004.

R. H. Moyer, M. Valley, and M. Cimolino, "Beam combination through stimulated Brillouin scattering," J. Opt. Soc. Amer. B, Opt. Phys., vol. 5, pp. 2473-2489, 1988.

J. T. Murray, W. L. Austin, and R. C. Powell, "Intracavity Raman conversion and Raman beam cleanup," Opt. Mater. (Amsterdam, Neth.) vol. 11, pp. 353-371, 1999.

J. Partanen and M. Shaw, "High-power forward Raman amplifiers employing low pressure gases in light guides. I. Theory and applications," J. Opt. Soc. Am. B, vol. 3, pp. 1374-1389, 1986.

H. M. Pask, The design and operation of solid-state Raman lasers, Progress in Quantum Electronics, vol. 27, pp. 3-56, 2003.

J. Reintjes, R. H. Lehmberg, R. S. F. Chang, M. T. Duignan, and C. Calame, "Beam cleanup with stimulated Raman scattering in the intensity-averaging regime," J. Opt. Soc. Am. B vol. 3, pp. 1408-1426, 1986.

D. A. Rockwell, M. S. Mangir, and J. J. Ottusch, "Energy scaling of phase-conjugate lasers and Brillouin conjugators," Int. J. Nonlinear Opt. Phys., vol. 2, pp. 131-155, 1993.

T. Schmidt-Uhlig, P. Karlitschek, G. Marowsky, Y. Sano, "New simplified coupling scheme for the delivery of 20 MW Nd:YAG laser pulses by large core optical fibers," Applied Physics B: Lasers and Optics vol. 72, pp. 183-186, 2001.

M. Shaw, J. Partanen, Y. Owadano, I. Ross, E. Hodgson, C. Edwards, and F. O'Neill, "High-power forward Raman amplifiers employing low-pressure gases in light guides. II: Experiments," J. Opt. Soc. Am. B, vol. 3, pp. 1466-1475, 1986.

T. M. Shay, V. Benham, J. T. Baker, B. Ward, A. D. Sanchez, M. A. Culpepper, D. Pilkington, J. Spring, D. J. Nelson, and C. A. Lu, "First experimental demonstration of self-synchronous phase locking of an optical array," Opt. Exp., vol. 14, pp. 12 015-12 021, 2006.

A. V. Smith, B. T. Do, "Bulk and surface laser damage of silica by picosecond and nanosecond pulses at 1064 nm", Appl. Optics, vol. 47, pp. 4812-4832, 2008.

A. K. Sridharan, S. Saraf, S. Sinha, R. L. Byer. "Zig-Zag slabs for solid state laser amplifiers: batch fabrication and parasitic oscillation suppression." Applied Optics, vol. 45, pp. 3340-3351, 2006.

Arun Kumar Sridharan, "Yb:YAG Master Oscillator Power Amplifier System and PPLN Optical Parametric Amplifiers for Remote Wind Sensing," Ph.D. Dissertation, Stanford University, 2007.

A. K. Sridharan, S. Saraf, and R. Byer, "Yb:YAG master oscillator power amplifier for remote wind sensing," Appl. Opt., vol. 46, pp 7552-7565, 2007.

A. Sridharan, J. Heebner, M. Messerly, J. Dawson, R. Beach, and C. Barty, "Brightness enhancement in a high-peak-power cladding-pumped Raman fiber amplifier," Opt. Lett., vol. 34, pp. 2234-2236, 2009.

D. S. Sumida, D. C. Jones, and D. A. Rockwell, "An 8.2 J phase-conjugate solid-state laser coherently combining eight parallel amplifiers," IEEE J. Quantum Electron., vol. 30, pp. 2617-2627, November 1994.

D. F. Welch and D. G. Mehuys, "High-power coherent, semiconductor laser, master oscillator power amplifiers and amplifier arrays," in Diode Laser Arrays, D. Botez and D. R. Scrifres, Eds. Cambridge, U.K.: Cambridge Univ. Press, pp. 72-122, 1994.

F. H. White III, Broadband Raman Beam Combiner, U.S. Pat. No. 4,993,031, 1990.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

We claim:

1. An apparatus, comprising
   a pulsed fiber seed laser for providing a pulsed seed beam having a first pulse peak power within a range from about 100 W to about 100 KW;
   a plurality of pulsed fiber pump lasers for providing pulsed pump beams, wherein each pump beam comprises a second pulse peak power within a range from about 10 KW to about 100 MW;
   a first stimulated Raman scattering (SRS) crystal consisting essentially of crystalline material and having a shape comprising a first face at a first end of said crystal, a second face at a second end of said crystal and an outer wall extending from said first face to said second face, wherein said first face is positioned to receive said seed beam and said pump beams;
   a reflective coating in direct contact with said outer wall, wherein said apparatus is configured such that said pump beams will propagate through said first face into said crystal and will then be confined within said crystal by reflecting a plurality of times from said reflective coating, wherein said pump beams will then propagate through said second face and out of said crystal wherein said apparatus is configured such that said seed beam will propagate through said first face in to said crystal and will then propagate within said crystal without undergoing any internal reflections, wherein said seed beam will then propagate through said second face and out of said crystal; and
   means for precisely timing said pulsed seed beam and said pulsed pump beams so that they are timed to be coincident in time on said crystal.

2. The apparatus of claim 1, wherein said pulsed pump beams comprise a first wavelength, wherein said pulsed seed beam comprises a second wavelength that is different from said first wavelength by a wavelength amount equal to about a stokes shift and wherein said SRS crystal produces Raman light if pumped at said first wavelength while said second wavelength is propagated through said SRS crystal.

3. The apparatus of claim 1, wherein said means comprises a first electro-optic, gated modulator (EOGM) and a second EOGM, wherein said first EOGM is configured and operatively located for precision control of the time-dependent pulse intensity of said seed beam and wherein said second EOGM is configured for precision control of the time-dependent pulse intensity of said pump beams.

4. The apparatus of claim 3, wherein said first EOGM and said second EOGM have a common synchronization trigger.

5. The apparatus of claim 1, further comprising an optical element operatively positioned for directing said pump beams into said crystal, such that said pump beams undergo multiple internal reflections within said crystal.

6. The apparatus of claim 1, further comprising an optical element operatively positioned for directing said pump beams into said crystal, such that said pump beams undergo multiple internal reflections within said crystal, wherein said optical element comprises a central opening that allows said seed beam to propagate unimpeded through said optical element.

7. The apparatus of claim 1, wherein said first face and said second face are each coated with an anti-reflection coating, and wherein said outer wall comprises four side wall surfaces, each coated with said reflective coating.

8. The apparatus of claim 1, wherein each said pump beam is incident on said crystal at a different angle of incidence.

9. The apparatus of claim 8, wherein said seed beam is incident on said crystal on the optical axis of said crystal, wherein each said pump beam is not incident on said crystal on the optical axis of said crystal.

10. The apparatus of claim 1, further comprising one or more additional SRS crystals aligned in series with said first SRS crystal, wherein said one or more additional SRS crystals are operatively positioned to receive Raman light produced by the prior stimulated Raman crystal in said series.

11. The apparatus of claim 1, wherein said SRS crystal has a Raman gain greater than 0.2 cm/GW.

12. The apparatus of claim 1, wherein said SRS crystal has a thermal conductivity greater than 1 W/(m-K).

13. The apparatus of claim 1, wherein said SRS crystal has a thermal optic coefficient that is negative.

14. The apparatus of claim 1, wherein said SRS crystal produces a Raman stokes shift that is less than 250 cm$^{-1}$.

15. The apparatus of claim 1, wherein said crystalline material is selected from the group consisting of Quartz, $CaF_2$, potassium tungstate family of crystals, Vanadate family of crystals ($VO_4$), Diamond and SiC.

16. The apparatus of claim 1, wherein said crystalline material has a thermal optic coefficient that is less than $1 \times 10^{-5}$/C.

17. The apparatus of claim 1, wherein said pulsed fiber seed laser comprises a master oscillator power amplifier system architecture and wherein said plurality of pulsed fiber pump lasers comprise a master oscillator power amplifier system architecture.

18. The apparatus of claim 1, wherein the fiber laser of said pulsed fiber seed laser comprises a dopant selected from the group consisting of $Yb^{3+}$, $Nd^{3+}$, $Er^{3+}$, $Tm^{3+}$, $Ho^{3+}$, $Pr^{3+}$ and $Sm^{3+}$ and wherein the fiber lasers of said plurality of pulsed fiber pump lasers comprise a dopant selected from the group consisting of $Yb^{3+}$, $Nd^{3+}$, $Er^{3+}$, $Tm^{3+}$, $Ho^{3+}$, $Pr^{3+}$ and $Sm^{3+}$.

19. A method, comprising
providing the apparatus of claim 1;
propagating said pulsed seed beam into said stimulated Raman scattering (SRS) crystal, wherein said pulsed seed beam comprises a first pulse peak power within a range from about 100 W to about 100 KW; and
propagating said plurality of pulsed pump beams into said first SRS crystal, wherein each pump beam comprises a second pulse peak power within a range from about 10 KW to about 100 MW, wherein said pulsed seed beam and said pulsed pump beams are precisely timed so that they are co-incident in time on said crystal.

20. The method of claim 19, wherein said pulsed pump beams comprise a first wavelength, wherein said pulsed seed beam comprises a second wavelength that is different from said first wavelength by a wavelength amount equal to about a stokes shift and wherein said SRS crystal produces Raman light when pumped at said first wavelength while said second wavelength is propagated through said SRS crystal.

21. The method of claim 19, wherein said plurality of pump beams are directed into said crystal such that they undergo multiple internal reflections within said crystal.

22. The method of claim 21, wherein said seed beam is directed into said crystal, such that it undergoes no internal reflections within said crystal.

23. The method of claim 19, wherein each said pump beam is incident on said crystal at a different angle of incidence.

24. The method of claim 23, wherein said seed beam is incident on said crystal on the optical axis of said crystal, wherein each said pump beam is not incident on said crystal on the optical axis of said crystal.

25. The method of claim 19, wherein said SRS crystal has a Raman gain greater than 0.2 cm/GW.

26. The method of claim 19, wherein said SRS crystal has a thermal conductivity greater than 1 W/(m-K).

27. The method of claim 19, wherein said SRS crystal has a thermal optic coefficient that is negative.

28. The method of claim 19, wherein said SRS crystal produces a Raman stokes shift that is less than 250 $cm^{-1}$.

29. The method of claim 19, wherein said crystalline material is selected from the group consisting of Quartz, $CaF_2$, potassium t-tungstate family of crystals, Vanadate family of crystals ($VO_4$), Diamond and SiC.

30. The method of claim 19, wherein said SRS crystal comprises crystal line material having a thermal optic coefficient that is less than $1 \times 10^{-5}$/C.

31. The method of claim 19, wherein said pulsed fiber seed laser comprises a master oscillator power amplifier system architecture and wherein said plurality of pulsed fiber pump lasers comprise a master oscillator power amplifier system architecture.

32. The method of claim 19, wherein said seed laser is provided by a pulsed fiber seed laser that comprises a dopant selected from the group consisting of $Yb^{3+}$, $Nd^{3+}$, $Er^{3+}$, $Tm^{3+}$, $Ho^{3+}$, $Pr^{3+}$ and $Sm^{3+}$ and wherein the fiber lasers of said plurality of pulsed fiber pump lasers comprise a dopant selected from the group consisting of $Yb^{3+}$, $Nd^{3+}$, $Er^{3+}$, $Tm^{3+}$, $Ho^{3+}$, $Pr^{3+}$ and $Sm^{3+}$.

\* \* \* \* \*